US010282819B2

United States Patent
Ikeda

(10) Patent No.: US 10,282,819 B2
(45) Date of Patent: May 7, 2019

(54) IMAGE DISPLAY CONTROL TO GRASP INFORMATION ABOUT IMAGE

(71) Applicant: SONY CORPORATION, Tokyo (JP)

(72) Inventor: Hiroshi Ikeda, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 158 days.

(21) Appl. No.: 13/834,112

(22) Filed: Mar. 15, 2013

(65) Prior Publication Data

US 2013/0300742 A1 Nov. 14, 2013

(30) Foreign Application Priority Data

May 11, 2012 (JP) ................................. 2012-109093

(51) Int. Cl.
*G06T 5/00* (2006.01)
*G09G 5/14* (2006.01)
*G06T 11/60* (2006.01)

(52) U.S. Cl.
CPC ................ *G06T 5/00* (2013.01); *G06T 11/60* (2013.01); *G09G 5/14* (2013.01)

(58) Field of Classification Search
None
See application file for complete search history.

(56) References Cited

U.S. PATENT DOCUMENTS

| | | | | |
|---|---|---|---|---|
| 5,926,617 A * | 7/1999 | Ohara et al. | | 358/1.9 |
| 6,906,746 B2 * | 6/2005 | Hijishiri | | H04N 1/0044 348/240.2 |
| 8,555,197 B2 * | 10/2013 | Kano et al. | | 715/794 |
| 2006/0033820 A1 * | 2/2006 | Honda | | G06T 11/60 348/218.1 |
| 2007/0025723 A1 * | 2/2007 | Baudisch et al. | | 396/287 |
| 2007/0242861 A1 * | 10/2007 | Misawa et al. | | 382/118 |
| 2007/0286528 A1 * | 12/2007 | Podilchuk | | G06F 17/30277 382/305 |
| 2008/0143969 A1 * | 6/2008 | Aufranc | | G03B 21/26 353/30 |
| 2010/0014780 A1 * | 1/2010 | Kalayeh | | G06T 1/00 382/284 |
| 2010/0123737 A1 * | 5/2010 | Williamson et al. | | 345/672 |

(Continued)

FOREIGN PATENT DOCUMENTS

| | | |
|---|---|---|
| JP | 11-313204 | 11/1999 |
| JP | 2001-177850 | 6/2001 |

(Continued)

OTHER PUBLICATIONS

Terry Duell and Bruno Postle, "Hugin tutorial—Blend masks", 201008.*

*Primary Examiner* — YuJang Tswei

(74) *Attorney, Agent, or Firm* — Chip Law Group

(57) ABSTRACT

There is provided a display control apparatus including a display control unit configured to display, on a display unit, at least one of a plurality of images in which an imaging range of one image overlaps at least a part of an imaging range of another image based on a user operation, and a control unit configured to, in a state in which the user operation has been performed, perform control to display a target image to be displayed, and area information indicating an overlapping area where the target image and an image other than the target image overlap.

14 Claims, 23 Drawing Sheets a b

(56) References Cited

U.S. PATENT DOCUMENTS

| | | | |
|---|---|---|---|
| 2010/0141737 A1* | 6/2010 | Li | G06T 3/4038 |
| | | | 348/36 |
| 2010/0172585 A1* | 7/2010 | Murashita | G06T 11/60 |
| | | | 382/168 |
| 2011/0037894 A1* | 2/2011 | Sbaiz | 348/441 |
| 2012/0131463 A1* | 5/2012 | Lefler | 715/730 |
| 2012/0188457 A1* | 7/2012 | Kato | H04N 5/23293 |
| | | | 348/569 |
| 2012/0269437 A1* | 10/2012 | He et al. | 382/180 |

FOREIGN PATENT DOCUMENTS

| | | |
|---|---|---|
| JP | 2012-160904 A | 8/2012 |
| JP | 2012-249145 A | 12/2012 |
| WO | 2005/024723 A | 3/2005 |

\* cited by examiner

FIG. 2
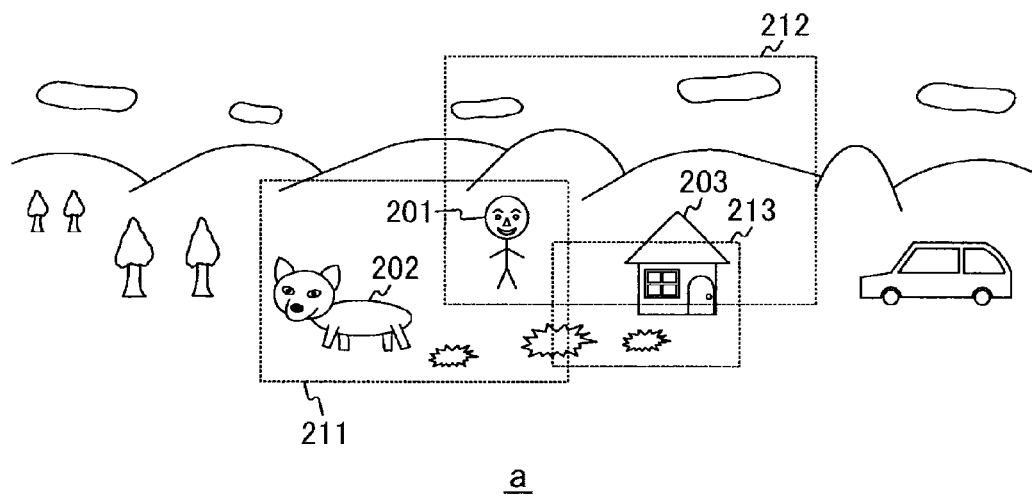
a
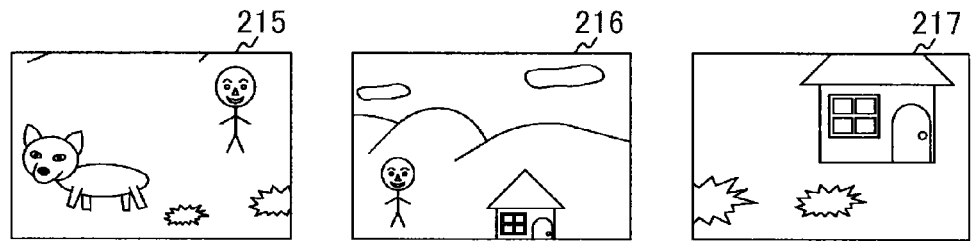
b

FIG. 3
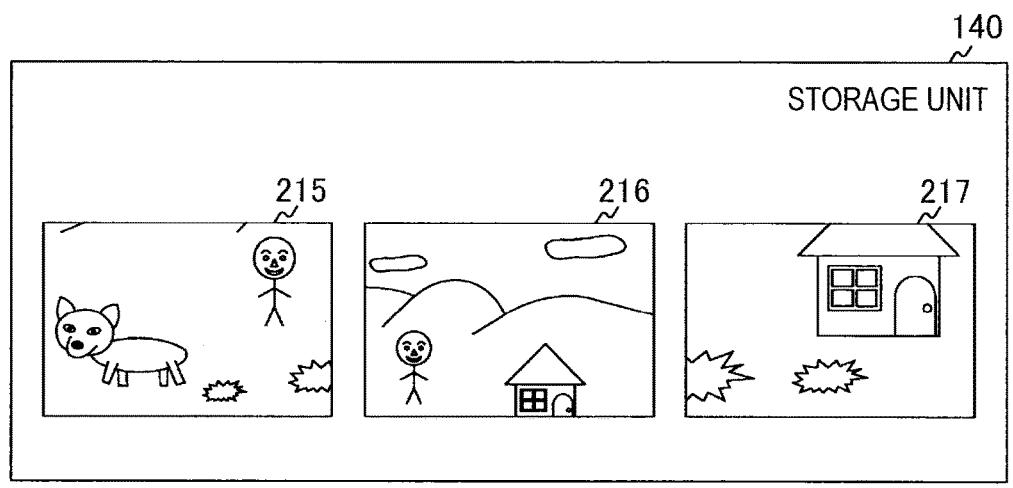
a
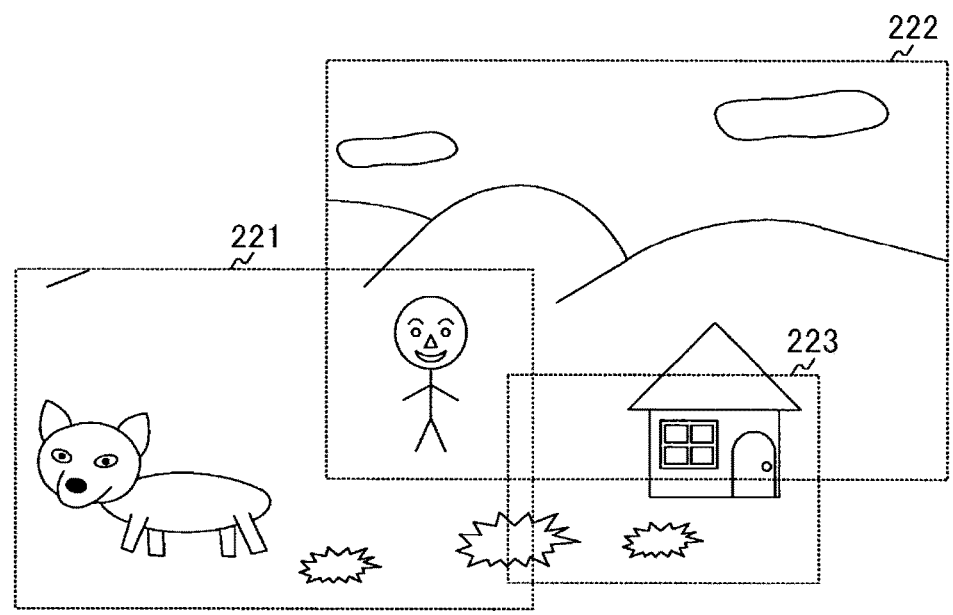
b

FIG. 4
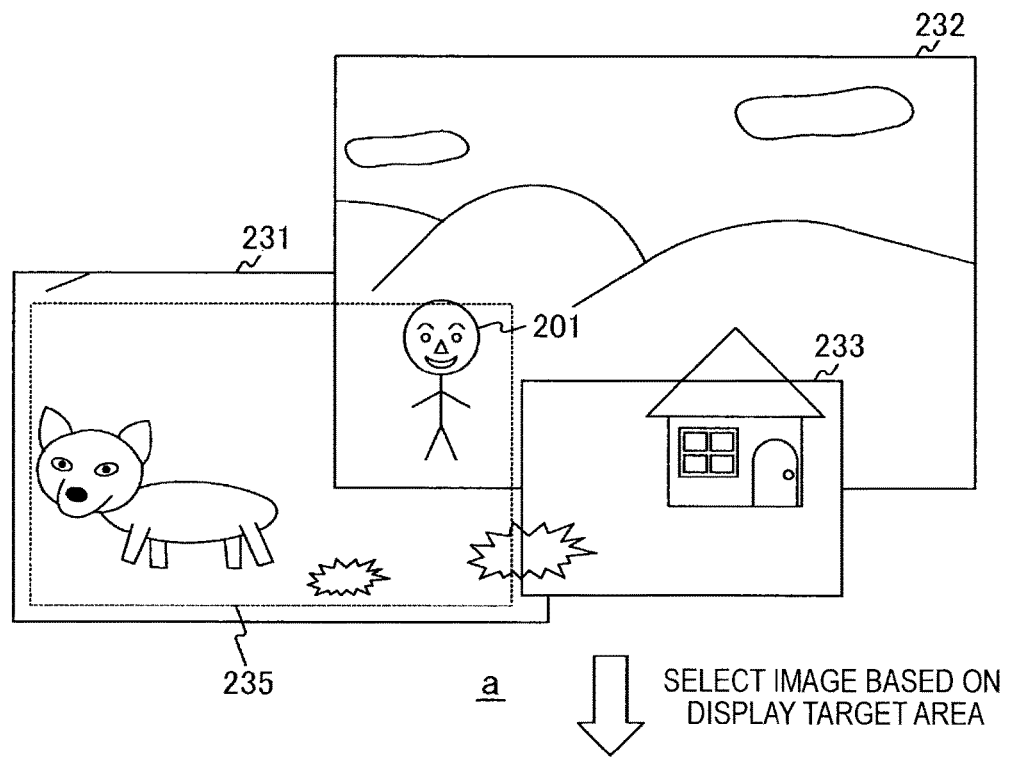
a ⬇ SELECT IMAGE BASED ON DISPLAY TARGET AREA
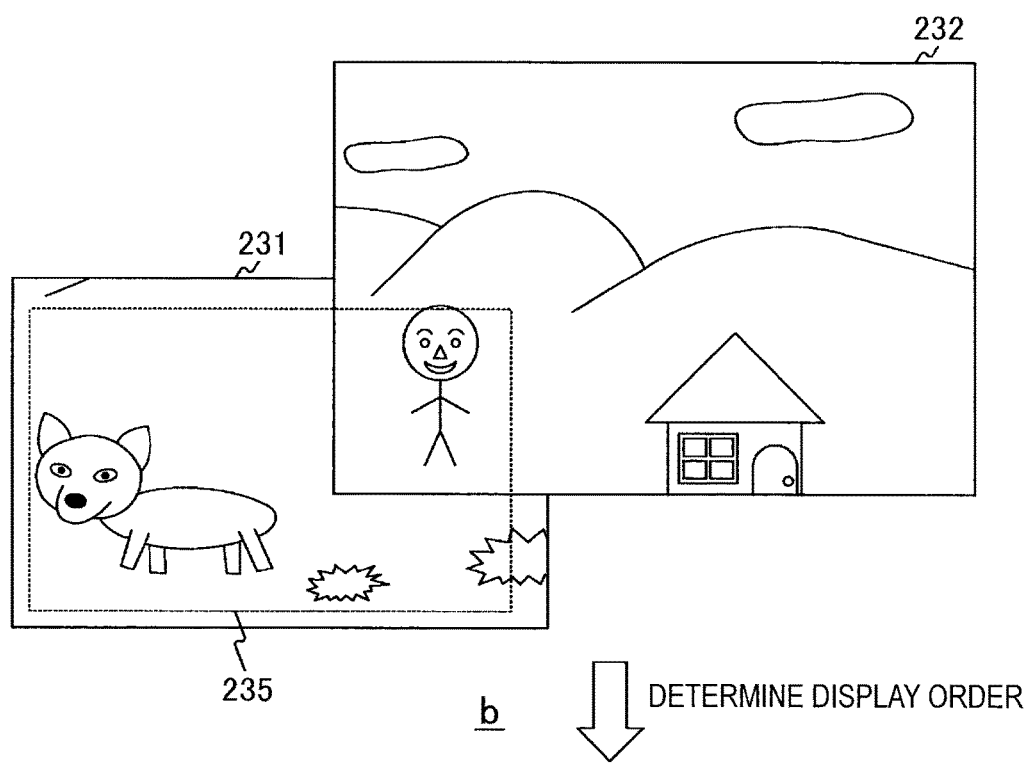
b ⬇ DETERMINE DISPLAY ORDER

FIG. 6
DISPLAY EXAMPLE WHEN USER OPERATION
HAS BEEN PERFORMED
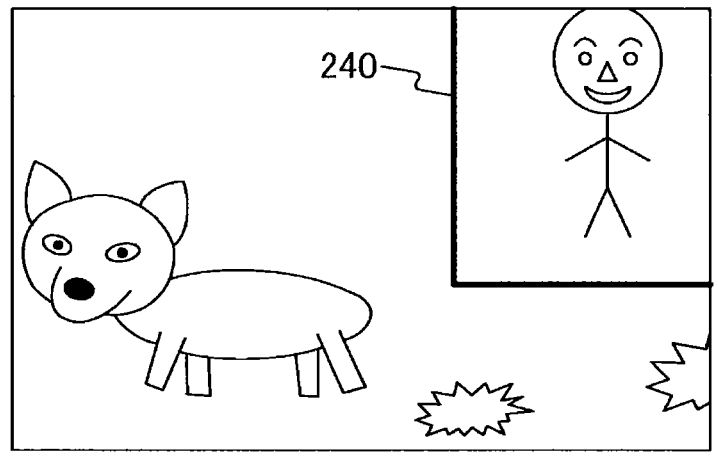
a
DISPLAY EXAMPLE WHEN USER OPERATION
HAS NOT BEEN PERFORMED
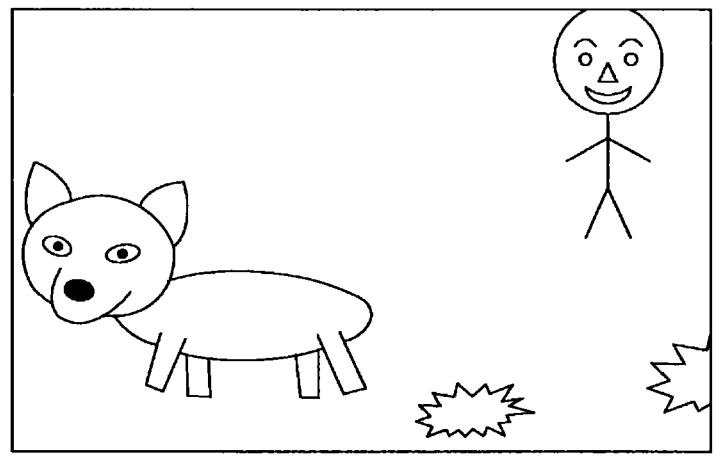
b

FIG. 8
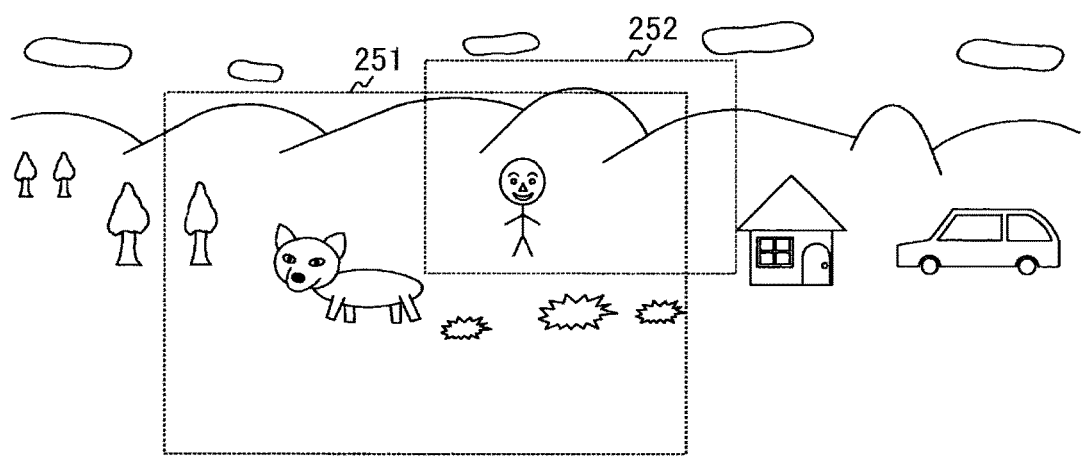
a
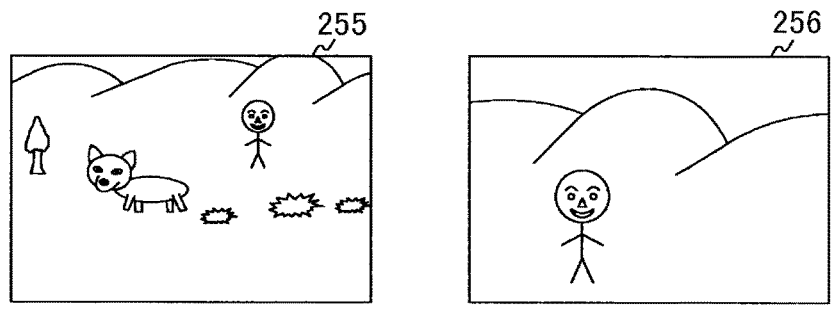
b

FIG. 10
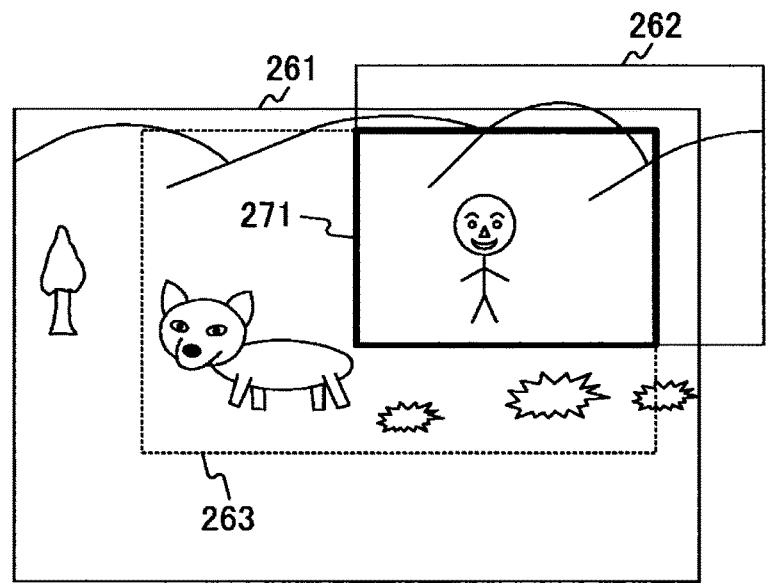
a
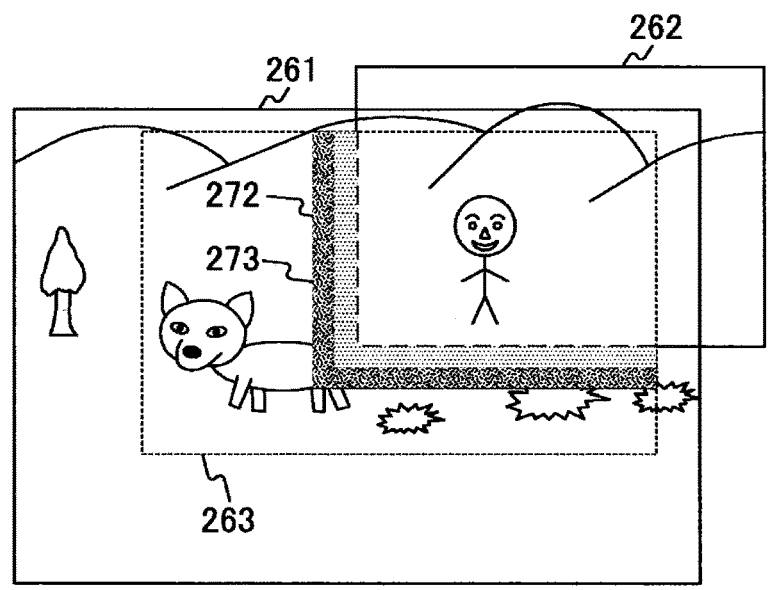
b

FIG. 12
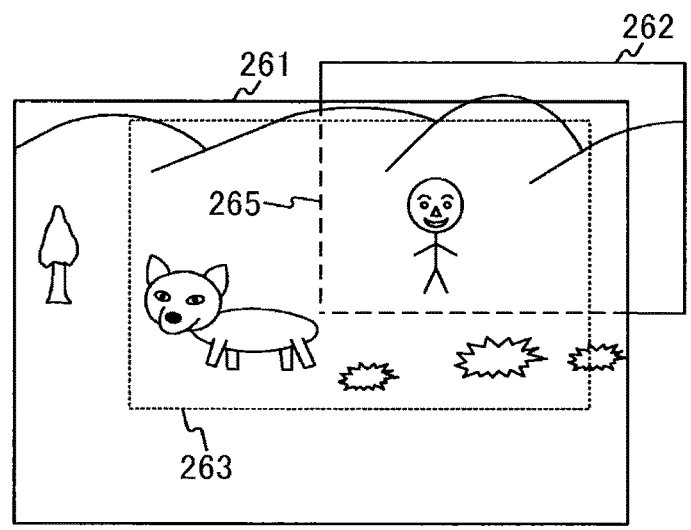
a
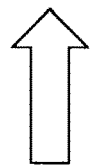 SELECTION OPERATION OF IMAGE 261 BY USER
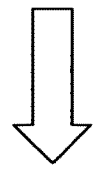 SELECTION OPERATION OF IMAGE 262 BY USER
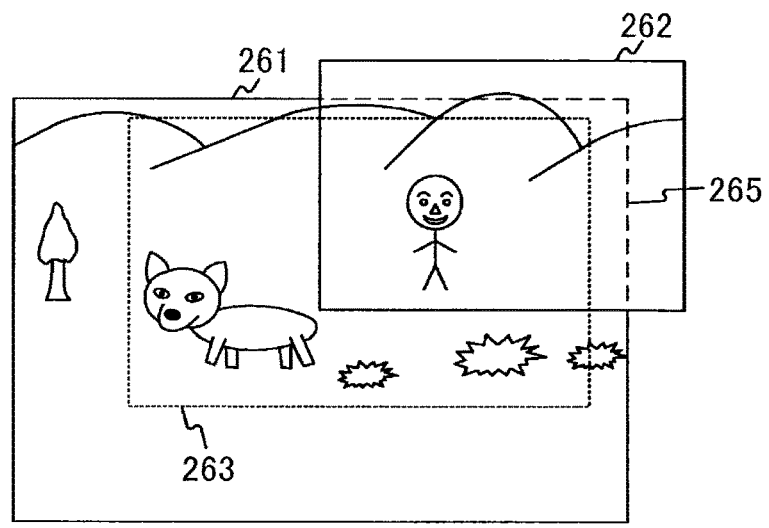
b

FIG. 13
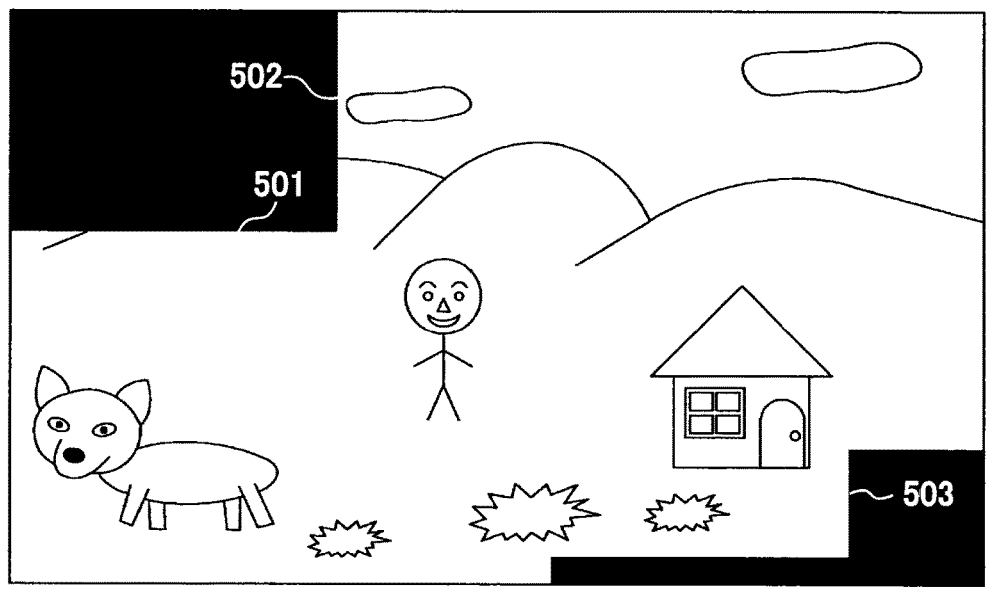
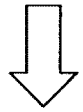
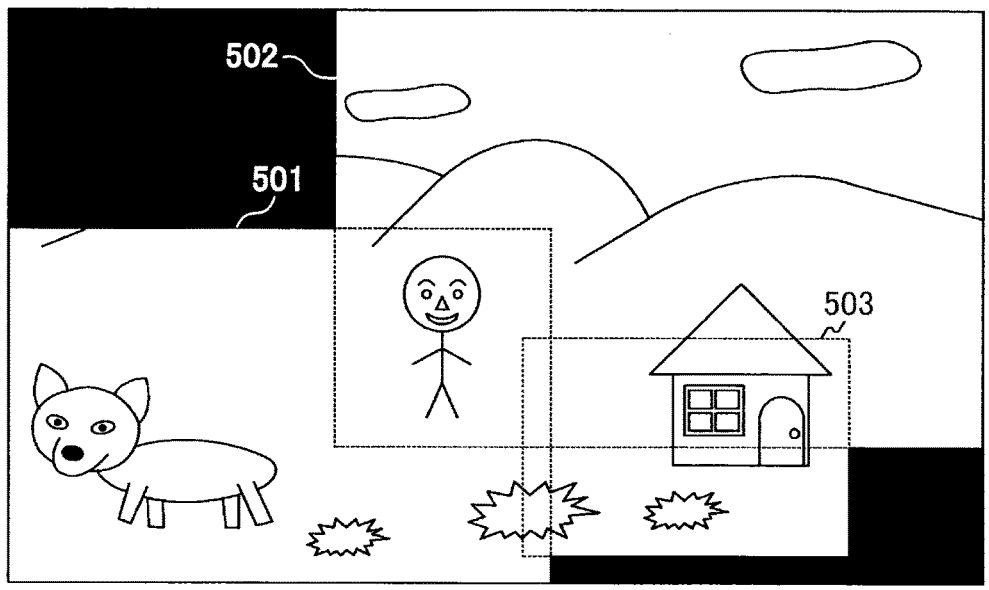

FIG. 14
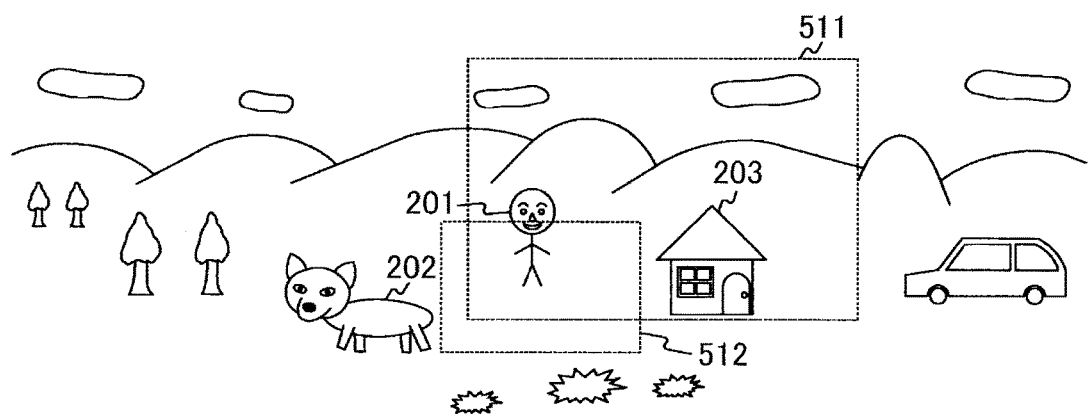
a
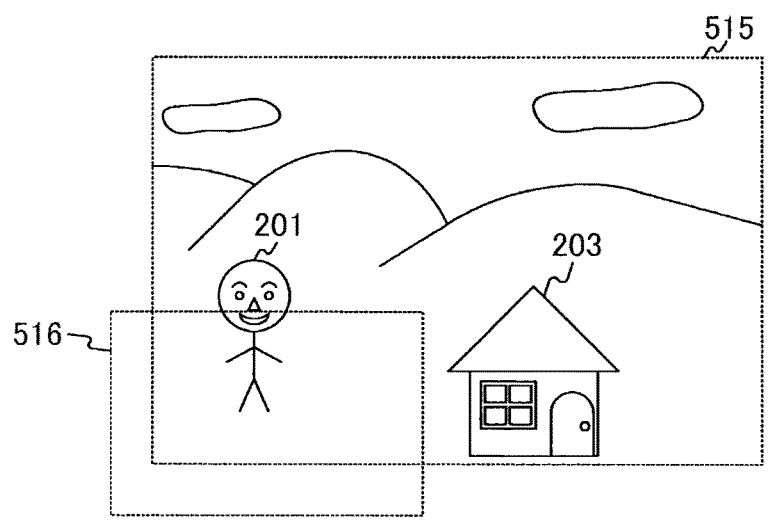
b

FIG. 16
EXAMPLE IN WHICH FRAME COLOR IS
CHANGED BASED ON ANGLE OF FIELD
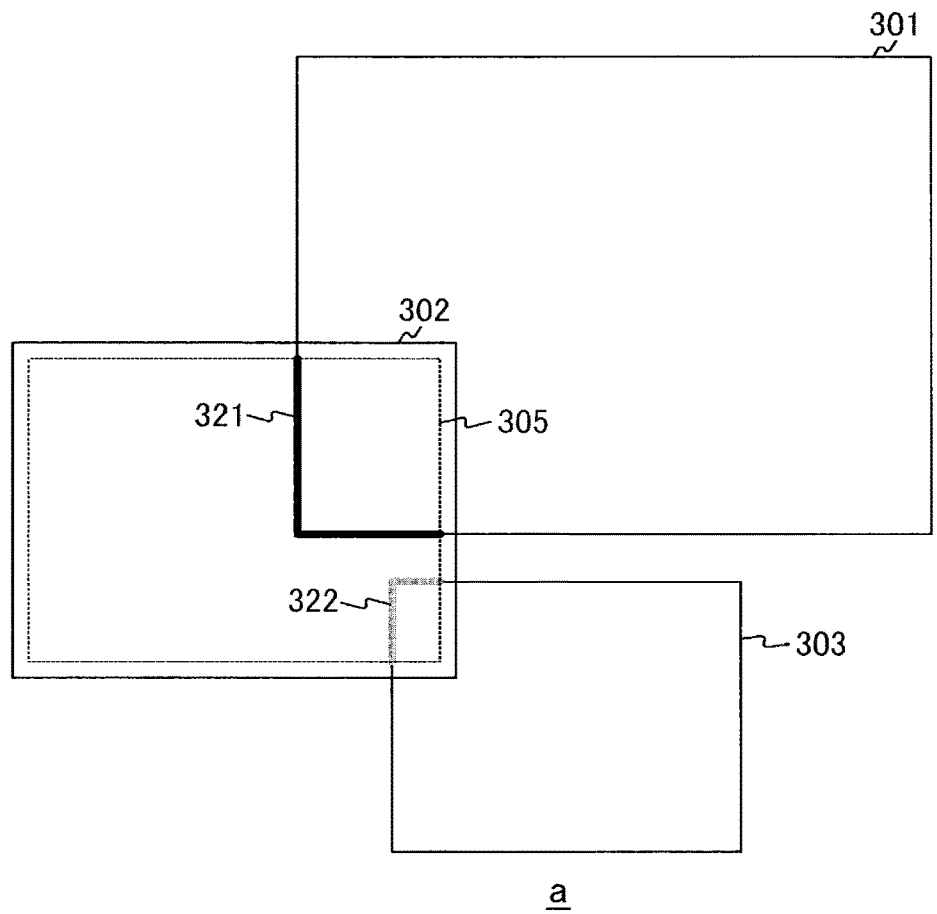
a
b

FIG. 17
EXAMPLE IN WHICH FRAME TYPE IS
CHANGED BASED ON ANGLE OF FIELD
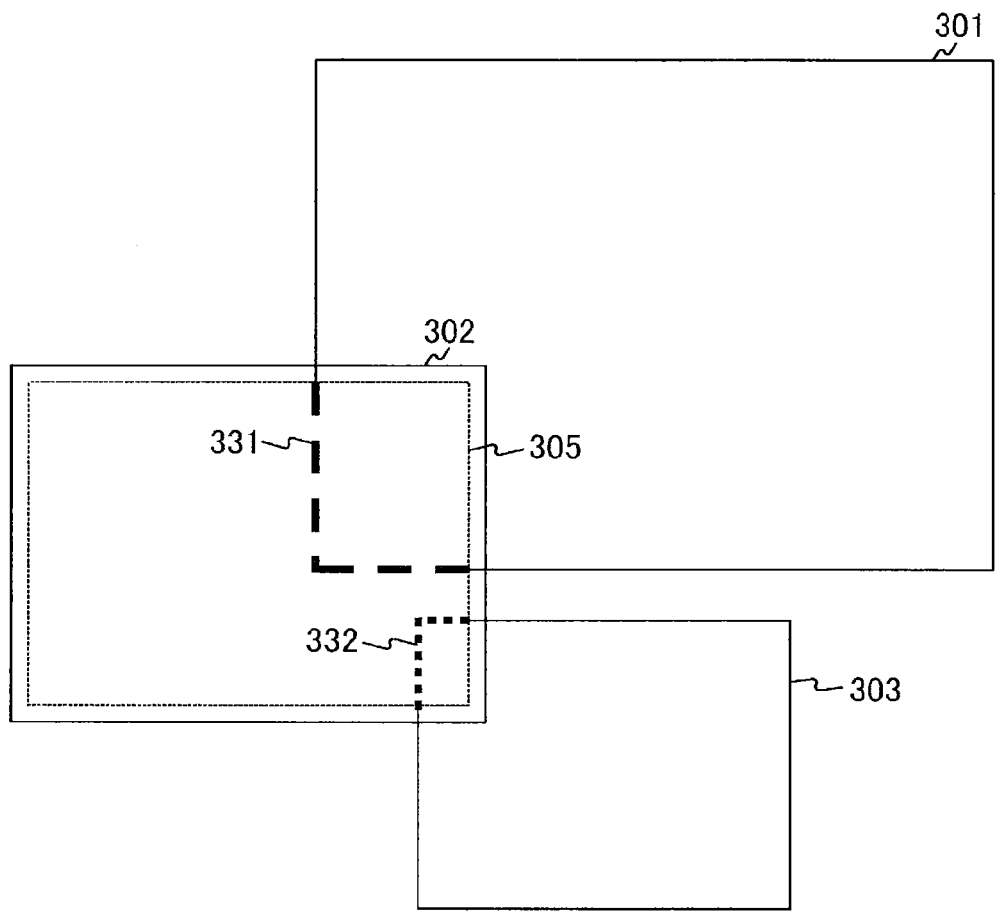
a
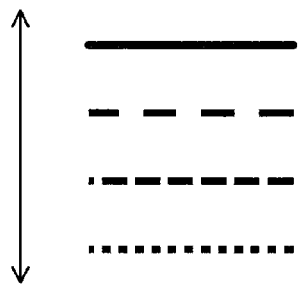
b

EXAMPLE IN WHICH AREA INFORMATION IS
DISPLAYED BY HIGHLIGHTING

EXAMPLE IN WHICH AREA INFORMATION IS DISPLAYED
BY HIGHLIGHTING WITH DIFFERENT COLORS

EXAMPLE IN WHICH AREA INFORMATION IS DISPLAYED
BY HATCHED DISPLAY

IMAGE DISPLAY CONTROL TO GRASP INFORMATION ABOUT IMAGE

BACKGROUND

The present technology relates to a display control apparatus. More specifically, the present technology relates to a display control apparatus and a display control method for displaying an image, and a program that makes a computer execute this method.

Recently, imaging apparatuses such as a digital still camera, a digital video camera (e.g., a camera built-in recorder) and the like, that generate image data by capturing an image of an object such as a person or scenery, and record that image data as image content, are becoming widespread. Further, a display control apparatus that can display such recorded image content based on a user operation has also been proposed.

For example, an apparatus that displays a trajectory along which an imaging apparatus has moved as a dotted line, and when the user designates an arbitrary position on this trajectory, display an image that is visible from that designated position has been proposed (e.g., refer to JP 2001-177850A).

SUMMARY

In the above-described related art, an image that is visible from a position desired by the user can be easily displayed by a user operation.

Thus, when displaying a plurality of images related to each other in an imaging space, if the user can easily grasp the information (imaging range, image quality etc.) about the images around the displayed image, the user will probably be able to view the images while enjoying them further.

According to an embodiment of the present technology, which was created in view of such a situation, when a plurality of related images are displayed, the user can easily grasp information about each image.

In light of the foregoing, according to a first embodiment of the present technology, there are provided a display control apparatus including a display control unit configured to display, on a display unit, at least one of a plurality of images in which an imaging range of one image overlaps at least a part of an imaging range of another image based on a user operation, and a control unit configured to, in a state in which the user operation has been performed, perform control to display a target image to be displayed, and area information indicating an overlapping area where the target image and an image other than the target image overlap, a display control method, and a program for causing a computer to execute the display control method. Consequently, there is the advantageous effect that, in a state in which a user operation has been performed, the target image serving as the display target is displayed along with area information indicating an overlapping area where the target image and an image other than the target image overlap.

Further, the control unit may be configured to perform control to display one or a plurality of the other images on the overlapping area. Consequently, there is the advantageous effect that one or a plurality of the other images is displayed on the overlapping area.

Further, the control unit may be configured to perform control to carry out image processing on a boundary area of a plurality of images displayed on the overlapping area in a manner that a resolution of each image matches. The display control unit may be configured to display the plurality of images subjected to the image processing carried out in a manner that the resolution matches. Consequently, there is the advantageous effect that, by carrying out image processing so that a resolution of each image for a boundary area of a plurality of images displayed on the overlapping area matches, a plurality of images that have been subjected to image processing so that their resolutions match are displayed.

Further, the control unit may be configured to perform control to superimpose the area information on the target image. Consequently, there is the advantageous effect that area information is superimposed on the target image.

Further, the control unit may be configured to perform control to change and display a display mode of the area information relating to the other image in accordance with image information about the plurality of images. Consequently, there is the advantageous effect that a display mode of the area information relating to another image is changed based on image information about the plurality of images.

Further, the control unit may be configured to perform control to display a linear image showing an outline corresponding to a display area of the other image as the area information, and to change at least one of a thickness, a color, and a type of the linear image as the display mode of the area information. Consequently, there is the advantageous effect that a linear image showing an outline corresponding to a display area of another image is displayed, and at least one among thickness, color, and type of the linear image is changed.

Further, the control unit may be configured to perform control to change a timing since the user operation has been finished and until the area information is deleted as the display mode of the area information. Consequently, there is the advantageous effect that a timing since the user operation has been finished and until the area information is deleted is changed.

Further, the display control unit may be configured to select at least one of the plurality of images as the image to be displayed on the display unit based on a resolution of each of the plurality of images when displayed. Consequently, there is the advantageous effect that at least one of the plurality of images is selected as the image to be displayed on the display unit based on a resolution of each of the plurality of images when displayed.

Further, the display control unit may be configured to display the other image when a displayed range of the target image is less than a predetermined proportion with respect to the target image. Consequently, there is the advantageous effect that another image is displayed when a displayed range of the target image is less than a predetermined ratio with respect to the target image.

Further, the display control unit may be further configured to select at least one of the plurality of images as the image to be displayed on the display unit based on a display capability of the display unit. Consequently, there is the advantageous effect that at least one of the plurality of images is selected as the image to be displayed on the display unit based on a display capability of the display unit.

Accordingly to the embodiments of the present technology, an excellent advantageous effect can be obtained that allows the user to easily grasp information about each image when a plurality of related images are displayed.

BRIEF DESCRIPTION OF THE DRAWINGS

FIG. 2 is a diagram that illustrates in a simplified manner the relationship between an image stored in a storage unit 140 and its imaging range according to the first embodiment of the present technology;

FIG. 3 illustrates a placement example of each image when images stored in the storage unit 140 are displayed on a display unit 112 according to the first embodiment of the present technology;

FIG. 4 schematically illustrates a determination method when determining an image (display target image) to be displayed on the display unit 112 according to the first embodiment of the present technology;

FIG. 6 illustrates a display example of images displayed on the display unit 112 according to the first embodiment of the present technology;

FIG. 8 is a diagram that illustrates in a simplified manner the relationship between an image stored in the storage unit 140 and its imaging range according to a second embodiment of the present technology;

FIG. 10 illustrates a display example of images displayed on the display unit 112 according to the second embodiment of the present technology;

FIG. 12 schematically illustrates a case in which the image (foreground image) to be displayed in the foreground of the display unit 112 is determined by a user operation according to the second embodiment of the present technology;

FIG. 13 is a diagram illustrating a display transition example of images displayed on the display unit 112 according to the second embodiment of the present technology;

FIG. 14 schematically illustrates a case in which the image (foreground image) to be displayed in the foreground of the display unit 112 is determined based on the object according to the second embodiment of the present technology;

FIG. 16 illustrates a display example in which area information is displayed along with the image (foreground image) to be displayed on the display unit 112 according to a third embodiment of the present technology;

FIG. 17 illustrates a display example in which area information is displayed along with the image (foreground image) to be displayed on the display unit 112 according to a third embodiment of the present technology;

DETAILED DESCRIPTION OF THE EMBODIMENT(S)

Figure 1:
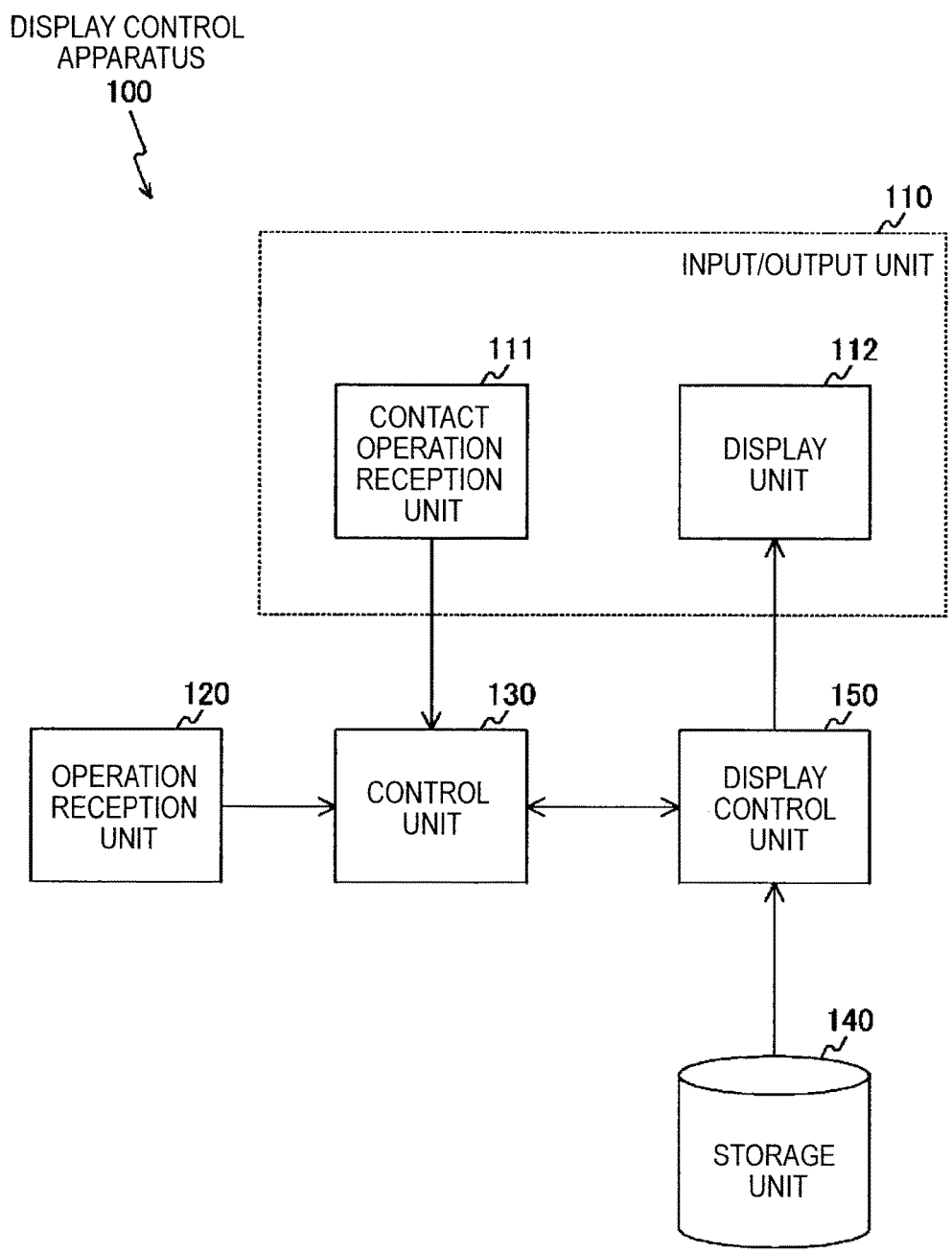
FIG. 1 is a block diagram illustrating a function configuration example of a display control apparatus 100 according to a first embodiment of the present technology.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Modes for carrying out the present technology (hereinafter referred to as "embodiments") will now be described in the following order.
1. First Embodiment (Display control: Example in which a target image that is displayed on a display unit is displayed along with area information indicating an overlapping area with another image while a user operation is being performed)
2. Second Embodiment (Display control: Example in which a foreground image is selected based on a predetermined condition)
3. Third Embodiment (Display control: Example in which an area information display mode is changed)

1. First Embodiment

Display Control Apparatus Function Configuration Example

FIG. 1 is a block diagram illustrating a function configuration example of a display control apparatus 100 according to a first embodiment of the present technology.

The display control apparatus 100 includes an input/output unit 110, an operation reception unit 120, a control unit 130, a storage unit 140, and a display control unit 150.

The input/output unit 110 includes a contact operation reception unit 111 and a display unit 112. As the contact operation reception unit 111, for example, an electrostatic (electrostatic capacitance type) touch panel that detects contact or proximity of a conductive object (e.g., a person's finger) based on changes in electrostatic capacitance can be used. Further, for example, as the display unit 112, a display panel such as an LCD (liquid crystal display) panel and an organic EL (electro luminescence) panel can be used. The input/output unit 110 is configured by superimposing a transparent touch panel over the display surface of the display panel, for example.

The input/output unit 110 displays various images on the display unit 112 under the control of the display control unit 150, and receives operation inputs from the user via the contact operation reception unit 111 based on the detection state of an object that is brought close to or into contact with the display surface (the display surface of the display unit 112). The contact operation reception unit 111 outputs a control signal (operation information) to the control unit 130 in response to a received operation input.

The contact operation reception unit ill receives an operation input relating to an object based on the detection state of the object (e.g., a user's finger) that is brought close to or into contact with the display surface of the input/output unit 110. For example, the contact operation reception unit 111 includes a plurality of electrostatic sensors arrayed in a lattice shape. In these electrostatic sensors, capacitance increases when a conductive object (e.g., the user's finger) is brought close to or into contact with the display surface of the input/output unit 110. When the capacitance of the electrostatic sensor changes, the contact operation reception unit 111 outputs information (electrostatic sensor information) including the capacitance value of that electrostatic sensor and a position of that electrostatic sensor on the operation surface of the contact operation reception unit 111 to the control unit 130.

The display unit 112 is a display panel that displays each image under the control of the display control unit 150. It is noted that display examples on the display unit 112 are illustrated in FIG. 6 and the like.

The operation reception unit 120, which receives operations performed by the user, outputs a control signal (operation information) to the control unit 130 based on the received operation content. The operation reception unit 120 corresponds to, for example, the operation members (up/down left/right buttons, scroll button, touch panel, arrow keys, mouse) included in the display control apparatus 100.

The control unit 130 controls the respective units in the display control apparatus 100 based on operation information from the operation reception unit 120 and operation information from the contact operation reception unit 111.

The control unit 130 controls the operation inputs by the user (e.g., a touch operation) received by the contact operation reception unit 111. For example, the control unit 130 detects a range (contact range) where the user's finger comes into contact with the display surface of the input/output unit 110 based on the electrostatic sensor information output from the contact operation reception unit 111, and converts the contact range into a coordinate based on a coordinate axis corresponding to the display surface. The control unit 130 calculates a shape of the contact range based on the converted coordinate and calculates the coordinate of the center of gravity in that shape. The control unit 130 takes this calculated coordinate of the center of gravity as the coordinate of the position (contact position) where the user's finger comes into contact. The control unit 130 recognizes the operation input by the user on the display surface of the input/output unit 110 based on operation information relating to the calculated shape of the contact range and the coordinate of the contact position (contact range shape, contact position coordinate etc.).

Here, a case will be described in which at least one among a plurality of images (e.g., the images 215 to 217 illustrated in FIG. 2b) in which the imaging range of one image overlaps at least a part of the imaging range of another image is displayed based on a user operation (e.g., the case illustrated in FIG. 6). In this case, in a state in which a user operation has not been performed, like illustrated in FIG. 6b, the control unit 130 displays only the image serving as the display target. On the other hand, for example, in a state in which a user operation has been performed, like illustrated in FIG. 6a, the control unit 130 displays the image serving as the display target and area information (frame 240) indicating an overlapping area where this image and another image overlap. In this case, the control unit 130 displays one or a plurality of images in which at least a part of the imaging range overlaps the image serving as the display target and area information as another image. Further, the control unit 130 also superimposes the area information (frame 240) on the image serving as the display target.

The storage unit 140 stores various information (still image content and moving image content). Further, the storage unit 140 supplies the various information that is stored to the display control unit 150.

The storage unit 140 stores, for example, image content (still image files) generated by an imaging apparatus (e.g., a digital still camera and a digital video camera (e.g., a camera built-in recorder)). This image content can store, for example, still image files based on a MP (multi picture) format that records a plurality of still images as a single file (extension: MPO). It is noted that an MP file (refer to "CIPA DC-007-2009 Multi Picture Format") is a format that enables one or a plurality of image to be recorded after a leading image.

For example, if an imaging mode is set in the imaging apparatus, based on a first image, the position (imaging position), orientation (rotational movement in the horizontal direction or the perpendicular direction), and focal length (zoom magnification) of the imaging apparatus when capturing subsequently generated images are sequentially detected. Namely, a relative coordinate relating to each image is detected. This imaging information (position (imaging position), orientation (imaging orientation), and focal length (zoom magnification)) can be associated with and recorded in each image as attribute information. For example, for a MP file, attribute information (imaging information) associated with each image can be stored in the header portion, and each image can be stored as an image file.

Here, the position (imaging position) of the imaging apparatus can be determined by, for example, a GPS (global positioning system) unit or an acceleration sensor. Further, accuracy can be improved by using the GPS unit and the acceleration sensor to determine the imaging position. The orientation (rotational movement in the horizontal direction or the perpendicular direction) of the imaging apparatus can be determined by, for example, a gyroscope sensor. The focal length can be determined based on the zoom magnification during the imaging operation.

It is noted that the imaging apparatus can also be included in the display control apparatus 100. If the imaging apparatus is included in the display control apparatus 100, each image generated by the imaging apparatus and the attribute information associated therewith are sequentially recorded in the storage unit 140.

The display control unit 150 outputs each image to the display unit 112 under the control of the control unit 130. For example, the display control unit 150 displays the image content (e.g., still image content or moving image content) stored in the storage unit 140 on the display unit 112.

Further, for example, the display control unit 150 displays at least one among a plurality of images (e.g., the images 215 to 217 illustrated in FIG. 3a) in which the imaging range of one image overlaps at least a part of the imaging range of another image based on a user operation. In this case, the display control unit 150 selects and displays in the foreground at least one among the plurality of images based on the resolution (resolution on the display screen) of each of the plurality of images when displayed.

Example of the Relationship Between the Display Target Image and the Imaging Range FIG. 2 is a diagram that illustrates in a simplified manner the relationship between an image stored in the storage unit 140 and its imaging range according to the first embodiment of the present technology.

In FIG. 2a, imaging ranges 211 to 213 are illustrated, in which a person 201 standing with a mountain in the background, a dog 202 walking in front of that person, and a nearby house 203 are the objects, for example. In FIG. 2b, images 215 to 217 corresponding to the imaging ranges 211 to 213 illustrated in FIG. 2a are illustrated.

The images 215 to 217 corresponding to the imaging ranges 211 to 213 are generated by, for example, performing a zoom operation in a (not illustrated) imaging apparatus or an orientation change (a tilting operation, a panning operation) in order to change the composition. In this case, the (not illustrated) imaging apparatus generates attribute information (imaging information) for each of the images 215 to 217 based on the position (imaging position) of the imaging apparatus, orientation (rotational movement in the horizontal direction or the perpendicular direction) of the imaging apparatus, and zoom magnification when capturing the images 215 to 217. Then, the (not illustrated) imaging apparatus associates this generated attribute information (imaging information) with the respective image, and records as image content. The thus-recorded image content is stored in the storage unit 140. This storage example is illustrated in FIG. 3a.

Image Placement Example

FIG. 3 illustrates a placement example of each image when images stored in the storage unit 140 are displayed on the display unit 112 according to the first embodiment of the present technology.

FIG. 3a schematically illustrates images 215 to 217 stored in the storage unit 140. It is noted that the images 215 to 217 are the same as the images 215 to 217 illustrated in FIG. 2b.

FIG. 3b schematically illustrates a placement example of each image when the images 215 to 217 illustrated in FIG. 3a are displayed on the display unit 112. In FIG. 3b, a virtual placement based on the assumption that the whole of images 215 to 217 is displayed is virtually illustrated with the dotted-line rectangles 221 to 223.

For example, the placement of each image (the dotted-line rectangles 221 to 223) can be determined using the attribute information associated with each of the images 215 to 217 stored in the storage unit 140. As described above, this attribute information is, for example, imaging information (the position (imaging position), orientation (imaging), and focal length (zoom magnification)). For example, based on one image (e.g., image 216), the display control unit 150 can determine the placement of other images (e.g., images 215 and 217).

Further, the display control unit 150 can also determine the imaging information (the position (imaging position), orientation (imaging), and focal length (zoom magnification)) by performing image processing on each of the images 215 to 217 stored in the storage unit 140. For example, the imaging information can be detected based on an association among the respective images detected by a block matching method. Namely, a relative coordinate relating to each image is detected by image processing.

It is noted that the placement of each image can also be determined using attribute information (imaging information) associated with each of the images 215 to 217 stored in the storage unit 140 and imaging information determined by image processing. For example, the display control unit 150 can also correct the placement of each image determined using attribute information (imaging information) associated with each image based on imaging information determined by image processing.

In addition, the placement of each image can also be determined by a user operation.

Determination Example of Display Target Image

Figure 5:
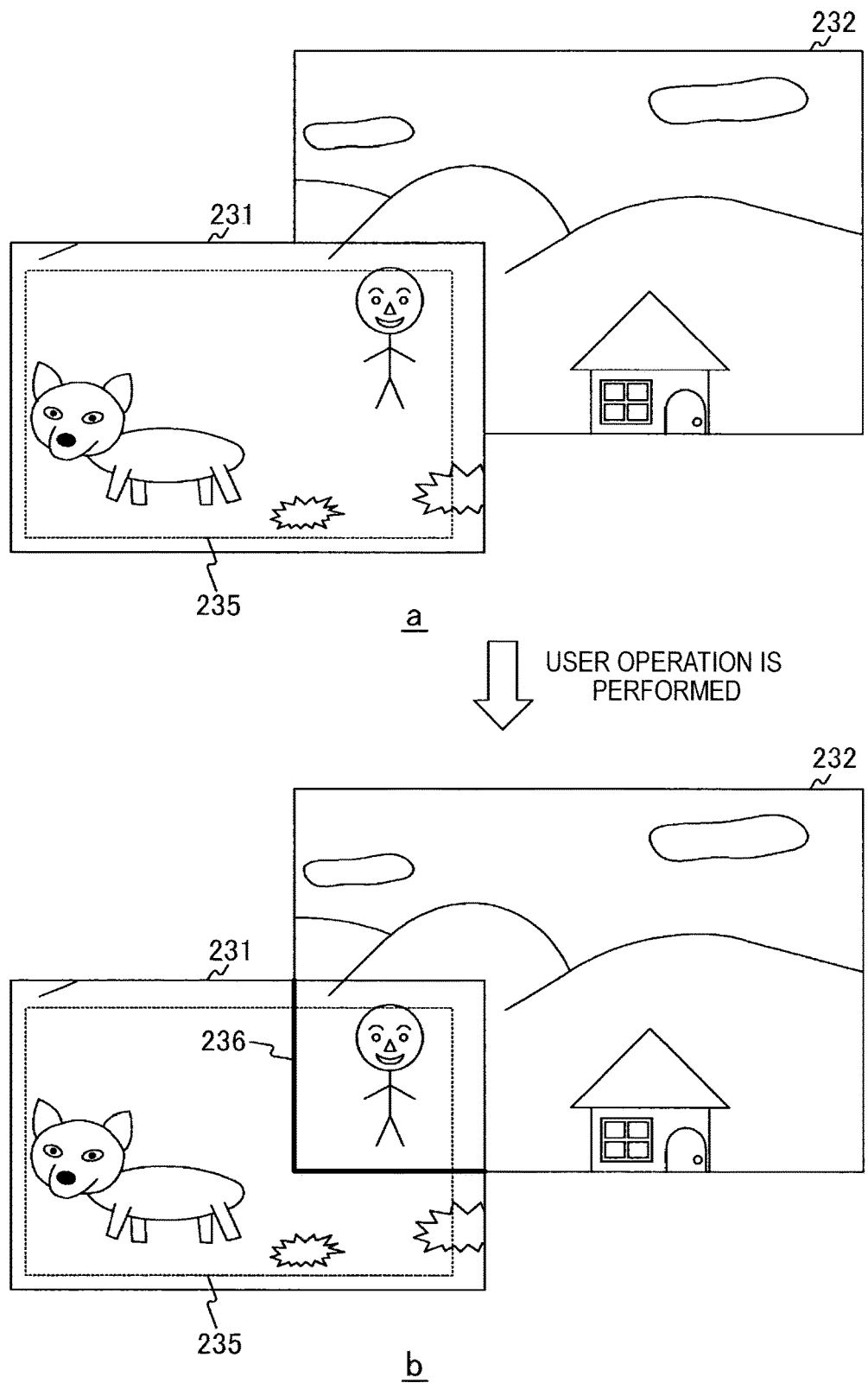
FIG. 5 schematically illustrates a determination method when determining an image (display target image) to be displayed on the display unit 112 according to the first embodiment of the present technology.

FIGS. 4 and 5 schematically illustrate a determination method when determining an image (display target image) to be displayed on the display unit 112 according to the first embodiment of the present technology.

FIG. 4a illustrates images 231 to 233, whose size changes based on the object, and which are placed overlapping each other at an overlapping portion. It is noted that images 231 to 233 correspond to images 215 to 217 illustrated in FIG. 3a, and that the placement of images 231 to 233 corresponds to the placements (dotted-line rectangles 221 to 223) illustrated in FIG. 3b. Further, the placement illustrated in FIG. 4a illustrates a virtual placement when it is assumed that the whole of images 231 to 233 is displayed.

Here, it is assumed that, if the images 231 to 233 illustrated in FIG. 4a are present as display target images, the user performs a designation operation for designating an observation point (display area) desired by the user. The designation operation is carried out using a touch operation or a pointing device on the display unit 112, for example.

Thus, when a designation operation has been performed, the display control unit 150 selects one or a plurality of images from among the plurality of images serving as display targets based on the observation point position designated by that designation operation. For example, all of the images that can be seen from the observation point position designated by that designation operation may be selected.

For example, a display target area 235 that is based on the observation point position designated by the designation operation is indicated by a dotted-line rectangle. In this case, the display control unit 150 selects the images 231 and 232 having at least a part thereof included in the display target area 235. For example, as illustrated in FIG. 4b, images 231 and 232 are selected.

Next, if a plurality of images was selected based on the observation point position, the display control unit 150 determines the image to be displayed on top (the top side in the perpendicular direction with respect to the display screen (i.e., the user side)) for the overlapping areas among the plurality of images. Namely, the display control unit 150 determines the display order in which the overlapping areas are displayed among the plurality of images on the display unit 112.

Here, as a method for determining the display order, an example will be illustrated that uses the resolution of the images when displayed (resolution on the display screen) as a reference, for example. Namely, an example is illustrated in which the image having the highest resolution when displayed is determined as the image to be displayed in the foreground (foreground image).

Here, "resolution of the image when displayed" means the number of pixels per unit length of the object. Further, this resolution can be calculated using the number of pixels, the angle of field, the zoom magnification, and the position (imaging position) of the imaging apparatus during image capture. For example, when an imaging operation is carried out with the same imaging apparatus from the same position with the same number of pixels and angle of field, the higher the zoom magnification during that imaging operation, the higher the resolution.

If, for example, each of the images 231 to 233 has the same number of pixels (e.g., 800 pixels×600 pixels), the angle of field of each of the images 231 to 233 when displayed will be different. For example, although the resolution of the object for the image 232, which has a large angle of field (has a large imaging range size), is low, the resolution of the object for the image 233, which has a small angle of field (has a small imaging range size), is high. Further, for example, although the resolution of the object for the image 232, which has a large angle of field (has a large imaging range size), is low, the resolution of the object for the image 231, which has a small angle of field (has a small imaging range size), is high.

For example, for the person 201 included in the images 231 and 232, the resolution of the person 201 included in image 231 is higher than the resolution of the person 201 included in image 232. Namely, when the images 231 and 232 are displayed on the same display screen at the same magnification (e.g., 100%), the person 201 included in image 231 will be larger than the person 201 included in image 232 (i.e., the resolution is higher).

It is noted that when there is a plurality of images that have the same resolution when displayed, or images for which that difference is small (e.g., images for which that difference is only about 10%), a natural display that has consistency can be achieved by arranging the images having a large display area in order in front.

Thus, the image 231 is determined to be the image that is displayed in the foreground based on a determination of the display order for the selected images 231 and 232. Namely, the image 231, which has a high resolution when displayed, is determined as the image to be displayed in the foreground among the plurality of images generated when an imaging operation is carried out using the same apparatus from the same position with the same number of pixels and angle of field. Specifically, the image 231 having a high zoom magnification during that imaging operation is determined as the image to be displayed in the foreground. For example, as illustrated in FIG. 5a, the image 231 is determined as the image to be displayed in the foreground.

The display control unit 150 displays the image 231 thus-determined as the image to be displayed in the foreground. In this case, the display control unit 150 displays only the display target area 235 in the image 231 on the display unit 112. This display example is illustrated in FIG. 5b.

However, if a user operation (e.g., a scroll operation, a zoom operation) has been performed, the display control unit 150 displays a frame 236 indicating the area of the image that overlaps the image (an image (area information) representing the edges of that image) displayed on the display unit 112. This display example is illustrated in FIG. 5b.

Image Display Example

FIG. 6 is a diagram illustrating a display example of an image displayed on the display unit 112 according to the first embodiment of the present technology.

FIG. 6a illustrates a display example when a user operation (e.g., a scroll operation, a zoom operation) has been performed. FIG. 6b illustrates a display example when a user operation has not been performed.

As illustrated in FIG. 6a, when a user operation (e.g., a scroll operation, a zoom operation) has been performed, in addition to the image displayed in the determined display order, a frame (area information) 240 indicating an area of the images overlapping this image is displayed.

In contrast, as illustrated in FIG. 6b, when a user operation has not been performed, the image is displayed in the determined display order. In this case, a frame (area information) indicating an area of the images overlapping the image serving as the display target is not displayed.

Display Control Apparatus Operation Example

Figure 7:
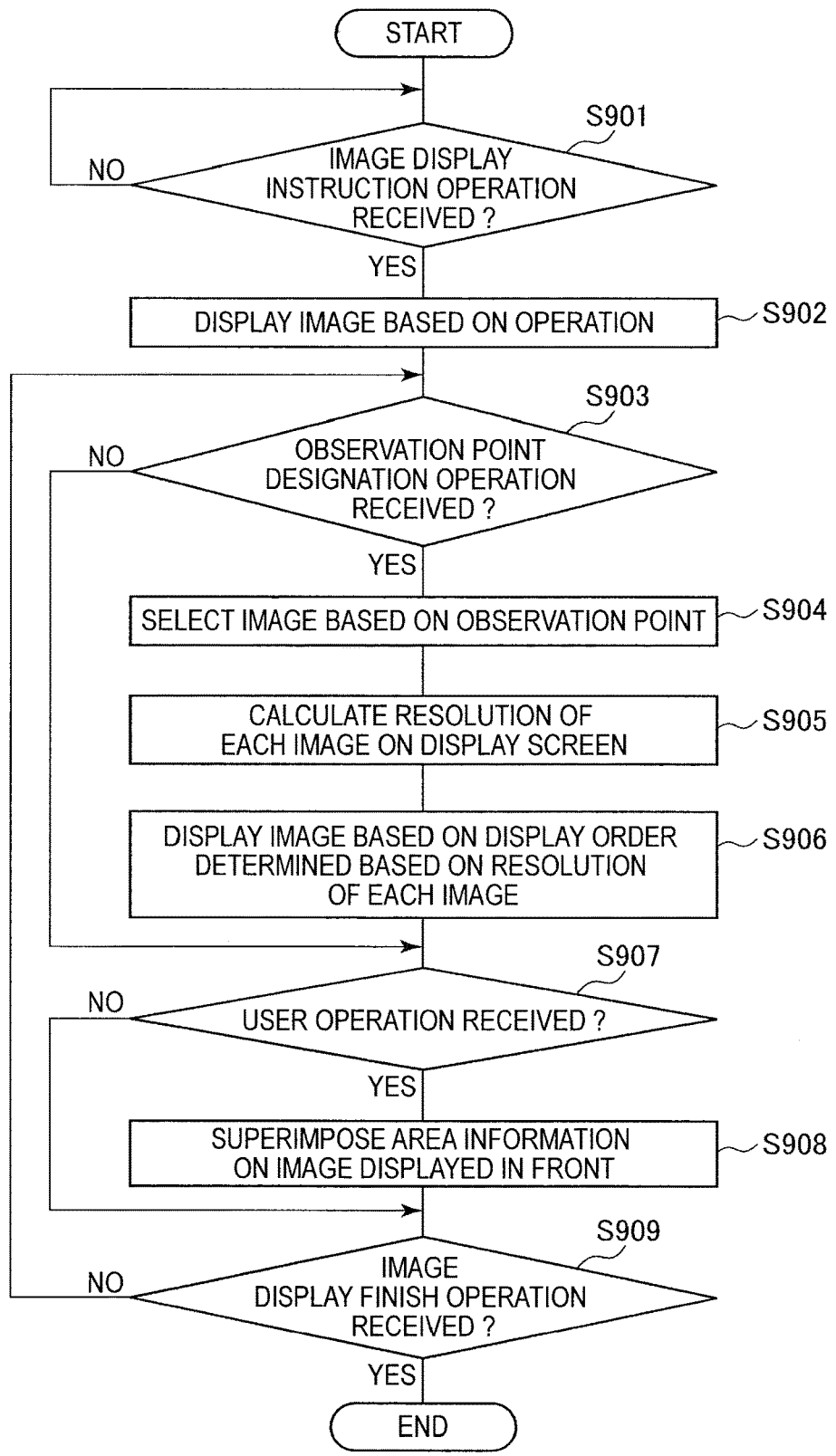
FIG. 7 is a flowchart illustrating an example of a processing procedure of display control processing performed by the display control apparatus 100 according to the first embodiment of the present technology.

FIG. 7 is a flowchart illustrating an example of a processing procedure of display control processing performed by the display control apparatus 100 according to the first embodiment of the present technology.

First, the control unit 130 determines whether a display instruction operation for an image stored by the image content in the storage unit 140 has been received by the contact operation reception unit 111 or the operation reception unit 120 (step S901). In step S901, if an image display instruction operation has not been received, monitoring is continued. On the other hand, in step S901, if an image display instruction operation has been received, the display control unit 150 displays an image based on that display instruction operation on the display unit 112 (step S902). For example, all of the images designated to be displayed by that display instruction operation may be displayed on the display unit 112.

Next, the control unit 130 determines whether a designation operation of an observation point (display area) in the images displayed on the display unit 112 has been received by the contact operation reception unit 111 or the operation reception unit 120 (step S903). The observation point designation operation may be, for example, a movement operation or a zoom operation of the observation point (display area). In step S903, if an observation point designation operation has been received, the processing proceeds to step S907. On the other hand, in step S903, if an observation point designation operation has not been received, the display control unit 150 selects one or a plurality of images based on the observation point selected by that designation operation (step S904).

Next, the display control unit 150 calculates the resolution of each selected image on the display surface (step S905). Then, the display control unit 150 determines the display order of the respective images based on the calculated resolution of each image (resolution on the display surface), and based on this determined display order, displays the selected images on the display unit 112 (step S906). For example, the images are displayed as illustrated in FIG. 6b.

Next, the control unit 130 determines whether some kind of user operation has been received by the contact operation reception unit 111 or the operation reception unit 120 (step S907). In step S907, if some kind of user operation has been received, the display control unit 150 superimposes the area information on the images displayed on the display unit 112

(step S908). For example, as illustrated in FIG. 6a, the frame (area information) 240 is displayed overlapping the images. On the other hand, in step S907, if a user operation has not been received, the processing proceeds to step S909. In this case, for example, as illustrated in FIG. 6b, a frame (area information) is not displayed.

Next, the control unit 130 determines whether an operation to finish image display has been received by the contact operation reception unit 111 or the operation reception unit 120 (step S909). In step S909, if an operation to finish image display has not been received, the processing returns to step S903. On the other hand, in step S909, if an operation to finish image display has been received, the display control processing operation is finished.

It is noted that steps S903 to S906 are an example of a first display procedure according to an embodiment of the present technology. Further, steps S907 and S908 are an example of a second display procedure according to an embodiment of the present technology.

2. Second Embodiment

In the first embodiment of the present technology, an example was illustrated in which the display order is determined based on the resolution of the images on the display screen. However, by adaptively selecting the image to be displayed in front based on the resolution of the images on the display screen and the resolution of the display screen (display), it is considered that an even more effective display can be achieved.

Accordingly, in a second embodiment of the present technology, an example is illustrated in which the display order is determined based on the resolution of the images on the display screen and the resolution of the display screen (display). It is noted that the configuration of the display control apparatus according to the second embodiment of the present technology is basically the same as the example illustrated in FIG. 1 and the like. Consequently, parts that are the same as in the first embodiment of the present technology are denoted with the same reference numerals, and a description of such parts is omitted.

Example of the Relationship Between the Display Target Image and the Imaging Range FIG. 8 is a diagram that illustrates in a simplified manner the relationship between an image stored in the storage unit 140 and its imaging range according to the second embodiment of the present technology.

In FIG. 8a, imaging ranges 251 and 252 are illustrated, in which a person standing with a mountain in the background and a dog walking in front of that person are the objects, for example. In FIG. 8b, images 255 and 256 corresponding to the imaging ranges 251 and 252 illustrated in FIG. 8a are illustrated.

It is noted that since the relationship example illustrated in FIG. 8 corresponds to FIG. 2, a detailed description thereof will be omitted here.

Foreground Image Determination Example

Figure 9:
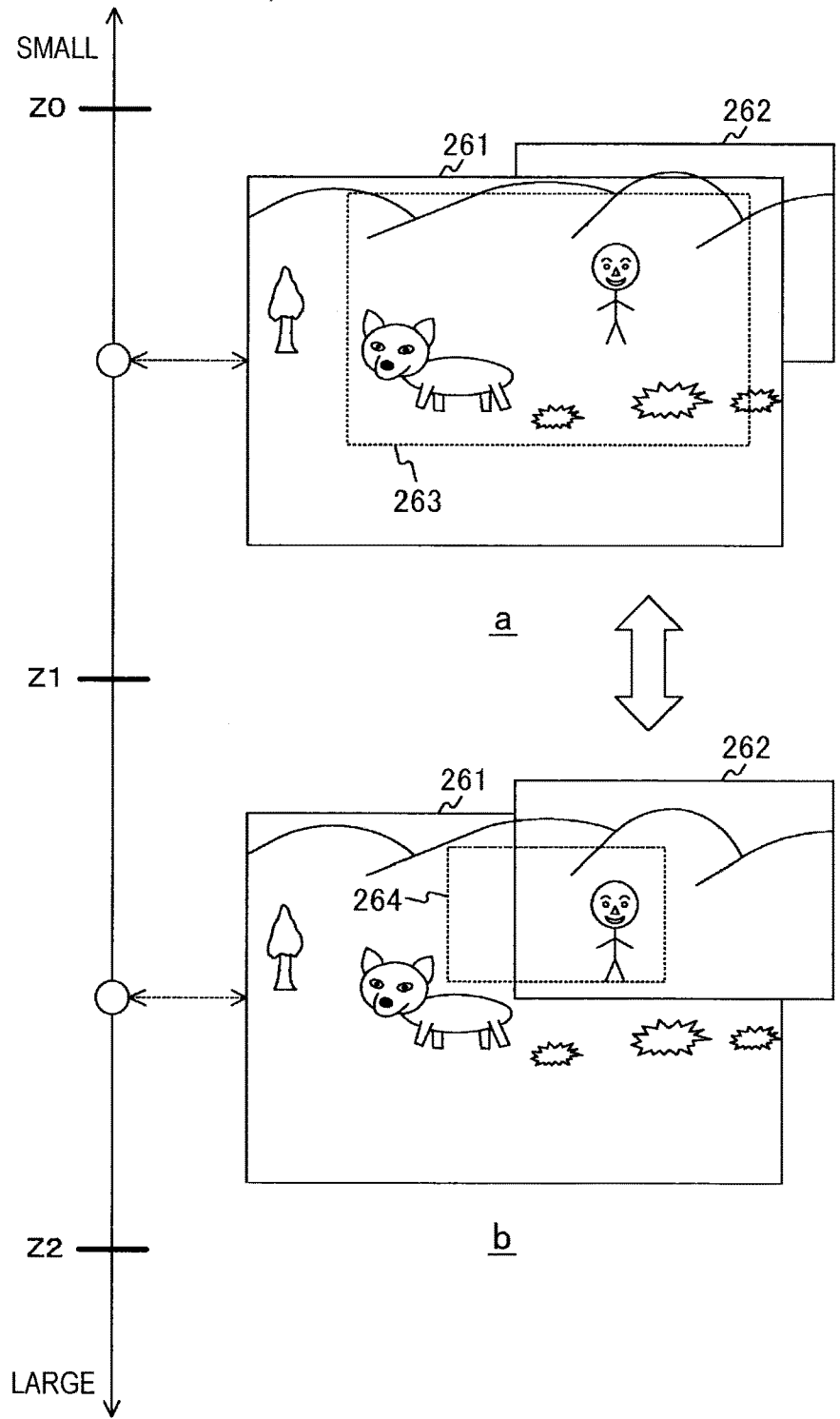
FIG. 9 schematically illustrates a determination method when determining the image (foreground image) to be displayed in the foreground of the display unit 112 according to the first embodiment of the present technology.

FIG. 9 schematically illustrates a determination method when determining the image to be displayed in the foreground (foreground image) of the display unit 112 according to the second embodiment of the present technology.

For example, when the resolution of the image serving as a display target is higher than the resolution of the display screen of the display unit 112 (i.e., when the image serving as a display target has a resolution that exceeds the display capability of the display), the user can see a high-resolution image. In contrast, when the resolution of the image serving as a display target is lower than the resolution of the display screen of the display unit 112, an image that has been enlarged by signal processing (i.e., an image that has suffered a decrease in resolution) is displayed on the display screen (display) of the display unit 112.

In order to acquire an image that has a higher resolution than the resolution of the display screen of the display unit 112 (a high-resolution image of the object), it is necessary to either perform the imaging operation by increasing the zoom magnification of the imaging apparatus based on that object, or to perform the imaging operation by moving the imaging apparatus closer to the object. However, when these operations (an imaging operation performed by increasing the zoom magnification of the imaging apparatus, or an imaging operation performed by moving the imaging apparatus closer to the object) are performed, the object area included in the image to be recorded becomes smaller. Consequently, when an image utilizing an image generated by these imaging operations is displayed, there is an increased likelihood that a composite image formed by combining a plurality of images is displayed. In such a case, the user will probably feel that something is wrong with the boundaries between the images. Further, this feeling is especially likely to occur if a moving object is included in the object.

Thus, when the resolution of the image serving as a display target is higher than the resolution of the display screen of the display unit 112, although the user can see a high-resolution image, the user will probably feel that something is wrong with the boundaries between the images. Consequently, in the second embodiment of the present technology, if the resolution of the image serving as a display target is higher than the resolution of the display screen of the display unit 112, an image in which an object with a comparatively wide range is displayed as the foreground image.

When the images 261 and 262 are displayed. On this vertical axis, the zoom magnification during display decreases moving in an upward direction, and increases moving in a downward direction. Further, on the vertical axis, Z1 represents the position where the display magnification is the same as the zoom magnification during the imaging operation of the image 261, and Z2 represents the position where the display magnification is the same as the zoom magnification during the imaging operation of the image 262. In addition, on the vertical axis, Z0 represents the position where the display magnification is smaller than the zoom magnification during the imaging operation of the image 261.

The white circle between Z0 and Z1 on the vertical axis illustrated in FIG. 9 represents the position of the zoom magnification (display magnification) corresponding to a display target area 263 illustrated in FIG. 9a. Similarly, the white circle between Z1 and Z2 on the vertical axis represents the position of the zoom magnification (display magnification) corresponding to a display target area 264 illustrated in FIG. 9b.

Further, the images 261 and 262 illustrated in FIG. 9 are based on a case in which, for example, the imaging operation is carried out with the same imaging apparatus from the same position with the same number of pixels and angle of field. In this case, image 261 is an image generated when the imaging operation is carried out at a wide angle of field side, and image 262 is an image generated when the imaging operation is carried out at a telephoto side.

In such a relationship, for example, up to the position Z1, which is where the display magnification is the same as the equal magnification of the image 261, the image 261 is determined as the foreground image. Further, when the display magnification exceeds the equal magnification of the image 261, the image 262 is determined as the foreground image. Namely, when the zoom magnification (equal magnification) during display <Z1 (e.g., in the case of the display target area 263), the image 261 is determined as the foreground image. On the other hand, when Z1≤ the zoom magnification (equal magnification) during display (e.g., in the case of the display target area 264), the image 262 is determined as the foreground image.

Thus, if images 261 and 262 having a resolution on the display screen equal to or more than a threshold (e.g., a value corresponding to equal magnification) are present, the image 261 whose resolution on the display screen is equal to or more than the threshold, and, whose resolution is the lowest, is displayed on the display unit 112 as the foreground image.

On the other hand, if images having a resolution on the display screen equal to or more than the threshold are not present (e.g., when equal magnification >Z2), the image 262, which has the highest resolution on the display screen, is displayed on the display unit 112 as the foreground image.

Thus, by determining the foreground image, a highly detailed (high resolution), natural image with few join lines can be displayed. Further, similar to the case in which the zoom magnification during display is fixed and the observation point position is moved, the foreground image can be determined and displayed by calculating the resolution of each image.

Another display example of a case in which the display capability of the display is higher than the resolution of the images on the display screen is illustrated in FIG. 10.

FIG. 10 illustrates a display example of images displayed on the display unit 112 according to the second embodiment of the present technology. It is noted that the relationship between the position and the display area of the images illustrated in FIGS. 10a and 10b is the same as in FIG. 9a. Consequently, in FIGS. 10a and 10b, the images are denoted with the same reference numerals as in FIG. 9a.

The case illustrated in FIG. 10a is an example in which, among images 261 and 262, the display target area 263 is displayed. In this case, since the resolution of the image 262 on the display screen is greater than the resolution of the image 261 on the display screen, for the overlapping area 271 of images 261 and 262, the image 262 is displayed, and for the other areas, the image 261 is displayed.

Here, since the resolution at the boundaries of the images 261 and 262 in the display target area 263 is different, those boundary portions stand out and look unnatural. Therefore, those boundary portions can be made to look natural by performing predetermined image processing (image processing to reduce the difference in resolution) on the images near the boundaries, for example. Examples of this predetermined image processing may include processing that gradually lowers the resolution of the image with the higher resolution in the vicinity of the boundary lines to match that of the image with the lower resolution, and super-resolution processing.

Here, an example of super-resolution processing will be illustrated. For example, as illustrated in FIG. 10b, super-resolution can be performed in stages with differing levels in the vicinity of the boundary between the image 261 and the image 262. Specifically, of areas 272 and 273 near the boundary between the image 261 and the image 262, a low level of super-resolution can be performed for area 272, and a high level of super-resolution can be performed for area 273. Thus, for example, the level of super-resolution processing is increased moving further away from the boundary. Consequently, the boundary portions can be made to stand out less, enabling the boundary portions to look natural.

Thus, the control unit 130 performs control to perform image processing so that the resolution among the respective images matches at the boundary areas of a plurality of images displayed at an overlapping area. Further, the display control unit 150 displays the plurality of images subjected to image processing that was performed so that their resolution matched.

In addition, for example, as illustrated in FIG. 9a, when the displayed range of a target image is less than a predetermined ratio with respect to the target image, the display control unit 150 displays some other image. The display control unit 150 selects at least one among the plurality of images as the image to be displayed on the display unit 112 based on the display capability of the display unit 112.

Display Control Apparatus Operation Example

Figure 11:
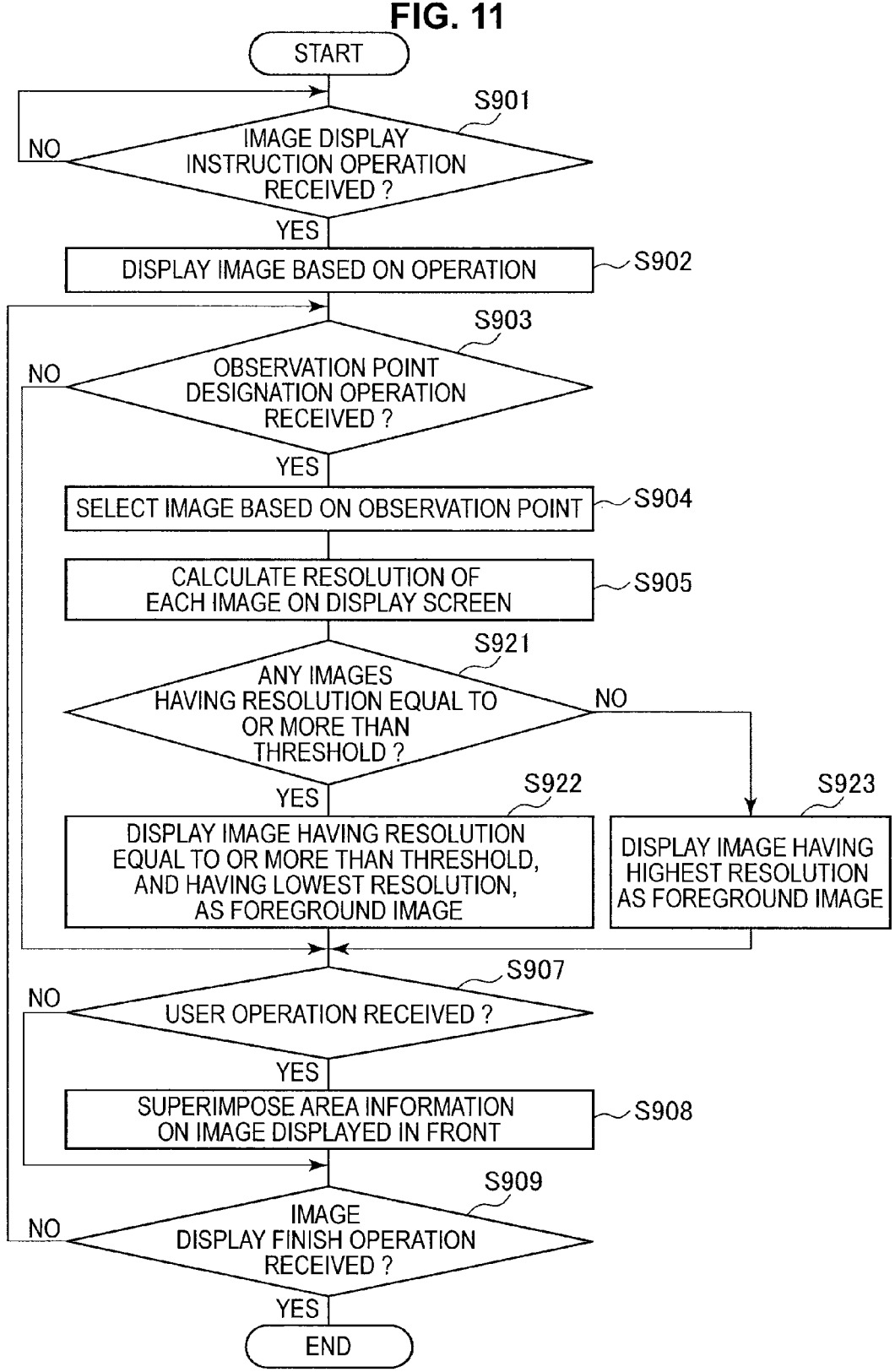
FIG. 11 is a flowchart illustrating an example of a processing procedure of display control processing performed by the display control apparatus 100 according to the second embodiment of the present technology.

FIG. 11 is a flowchart illustrating an example of a processing procedure of display control processing performed by the display control apparatus 100 according to the second embodiment of the present technology. It is noted that since FIG. 11 is a modified example of FIG. 7, steps that are the same as FIG. 7 are denoted with the same reference numerals, and a description of such parts is omitted.

The display control unit 150 determines whether an image is present among the images selected based on observation point that has a calculated resolution (resolution on the display screen) that is equal to or more than a threshold (step S921). In step S921, if an image having a resolution that is equal to or more than the threshold is present, the display control unit 150 displays the image that has a calculated resolution (resolution on the display screen) is equal to or more than the threshold, and, that has the lowest resolution, as the foreground image on the display unit 112 (step S922). For example, as illustrated in FIG. 9a, the image 261 is displayed as the foreground image.

On the other hand, in step S921, if an image having a calculated resolution that is equal to or more than the threshold is not present, the display control unit 150 displays the image having the highest calculated resolution (resolution on the display screen) as the foreground image on the display unit 112 (step S923).

In the case of placing greatest priority on image quality, a value corresponding to equal magnification can be used as the threshold. However, some other value may also be used as the threshold, or the threshold may be set by a user operation.

An example was described above in which the foreground image is automatically determined and displayed. However, the foreground image can also be selected by a user operation, or based on the object. Examples of these are illustrated in FIGS. 12 to 14.

Foreground Image Determination Example

FIG. 12 is a diagram schematically illustrating a case in which the image (foreground image) to be displayed in the foreground of the display unit 112 is determined by a user operation according to the second embodiment of the present technology. It is noted that the relationship between the images 261 and 262 is the same as in FIG. 9a.

FIG. 12a illustrates a display example when the image 261 was selected as the foreground image by a user operation. Further, FIG. 12b illustrates a display example when the image 262 was selected as the foreground image by a user operation.

The method for selecting the foreground image will now be described. For example, by selecting (e.g., double clicking) an overlapping area of a plurality of images (e.g., the overlapping area 265 illustrated in FIGS. 12a and 12b), the image displayed in front and an image displayed to the rear of that image can be switched. Consequently, the user can easily switch the image that he/she wishes to see.

For example, as illustrated in FIG. 12, by performing a selection operation for the overlapping area 265 of the image 261 and the image 262, the image displayed in front can be switched. For example, in the state illustrated in FIG. 12a, if a selection operation of the overlapping area 265 is performed, the display switches to the state illustrated in FIG. 12b. Further, in the state illustrated in FIG. 12b, if a selection operation of the overlapping area 265 is performed, the display switches to the state illustrated in FIG. 12a. Thus, for example, if there are two images serving as display targets, the display can be set to return to the original state by performing a selection operation twice.

It is noted that if there are three images serving as display targets, the display can be set to return to the original state by performing a selection operation three times. Further, if there are four or more images serving as display targets, the display can be set to return to the original state by performing a selection operation the same number of times as there are images serving as display targets. In this case, each time a selection operation is performed, the foreground image is sequentially changed according to the display order.

Image Display Transition Example

FIG. 13 is a diagram illustrating a display transition example of the images displayed on the display unit 112 according to the second embodiment of the present technology. It is noted that the relationship between placement and display area of the images illustrated in FIGS. 13a and 13b is the same as in FIG. 3b.

In FIG. 13, an example is illustrated in which three images, images 501 to 503, are displayed. In this case, a predetermined image (e.g., a black or a gray image) is displayed in the areas where an image generated by the imaging apparatus is not placed.

As illustrated in FIG. 13a, when no user operation has been performed, the three images 501 to 503 are displayed, all of them without a frame. On the other hand, as illustrated in FIG. 13b, when a user operation has been performed, the three images 501 to 503 are displayed with a frame around each image.

Further, in the state illustrated in FIG. 13a or 13b, if one image is selected by a user operation, only that image is displayed. For example, if the image 501 is selected by a user operation, only the image 501 is displayed. For example, when a user operation has not been performed, the image illustrated in FIG. 6b is displayed, and when a user operation has been performed, the image illustrated in FIG. 6a is displayed.

Foreground Image Determination Example

FIG. 14 is a diagram schematically illustrating a case in which the image (foreground image) to be displayed in the foreground of the display unit 112 is determined based on the object according to the second embodiment of the present technology.

In FIG. 14a, imaging ranges 511 and 512 are illustrated, in which a person 201 standing with a mountain in the background, a dog 202 walking in front of that person, and a nearby house 203 are the objects, for example. In FIG. 14b, a placement example of each image is illustrated when images 515 and 516, which correspond to the imaging ranges 511 and 512 illustrated in FIG. 14a, are displayed on the display unit 112.

Further, in FIG. 14, an example is illustrated in which, when an image boundary crosses a specific physical object, the whole of a specific physical object is displayed. For example, as illustrated in FIG. 14b, the boundary of the image 516 crosses the person 201. In this case, for example, if only the image 516 is displayed, the upper portion of the person 201's face is cut off and may not be seen. Therefore, for example, rather than the image 516, the image 515 is displayed even when the image determined as the foreground image based on the resolution on the display screen was the image 516.

Here, examples of the specific physical object may include a person's face, a person's body, an animal (dog, cat), a vehicle (automobile, train) and the like. Further, various detection methods may be employed to detect the specific physical object. For example, a face detection method that is based on matching a template in which facial luminance distribution information is recorded with an actual image (e.g., refer to JP 2004-133637A), and a face detection method that is based on a section of skin color included in image data or features in a person's face may be employed. Further, as a method for detecting a person's body and the like, for example, a method that detects a specific physical object based on a comparison result between the gradient orientation of luminance for a plurality of areas in an image and the frequency distribution relating to the gradient intensity of luminance (e.g., refer to JP 2010-67102A) can be employed. In addition, a method can be employed that detects a specific physical object included in an image by a weak discriminator using rectangular features in that image (e.g., refer to JP 2009-212980A). Moreover, for example, a method can be employed that detects a specific physical object by detecting an attribute of physical object that is included in an image by a weak discriminator using a difference value in luminance between two points in the image.

Third Embodiment

In the first and second embodiments of the present technology, examples were illustrated in which a solid-line frame is displayed as area information. However, the display information can be displayed by some other display mode.

Accordingly, in a third embodiment of the present technology, examples are illustrated in which area information is displayed by various display modes. It is noted that the configuration of the display control apparatus according to the third embodiment of the present technology is basically the same as the example illustrated in FIG. 1 and the like. Consequently, parts that are the same as in the first embodiment of the present technology are denoted with the same reference numerals, and a description of such parts is omitted.

Examples in which Frame is Changed Based on the Size of the Angle of Field

FIGS. 15 to 20 are diagrams illustrating display examples in which area information (e.g., a frame indicating an overlapping area of an image) is displayed along with the image (foreground image) on the display unit 112 according to the third embodiment of the present technology.

Although images 301 to 303 have the same number of pixels (e.g., 800 pixels×600 pixels), these images have a different angle of field (i.e., the zoom magnification) during the imaging operation from each other. Further, images 301 to 303 are placed in a similar manner to the relationship illustrated in FIG. 3*b*. In addition, the image 302 is determined as the foreground image. A display target area 305 is expressed as a dotted-line rectangular shape. It is noted that the objects included in images 301 to 303 are respectively omitted. Further, the examples illustrated in FIGS. 16 and 17 are configured in the same manner.

Figure 15:
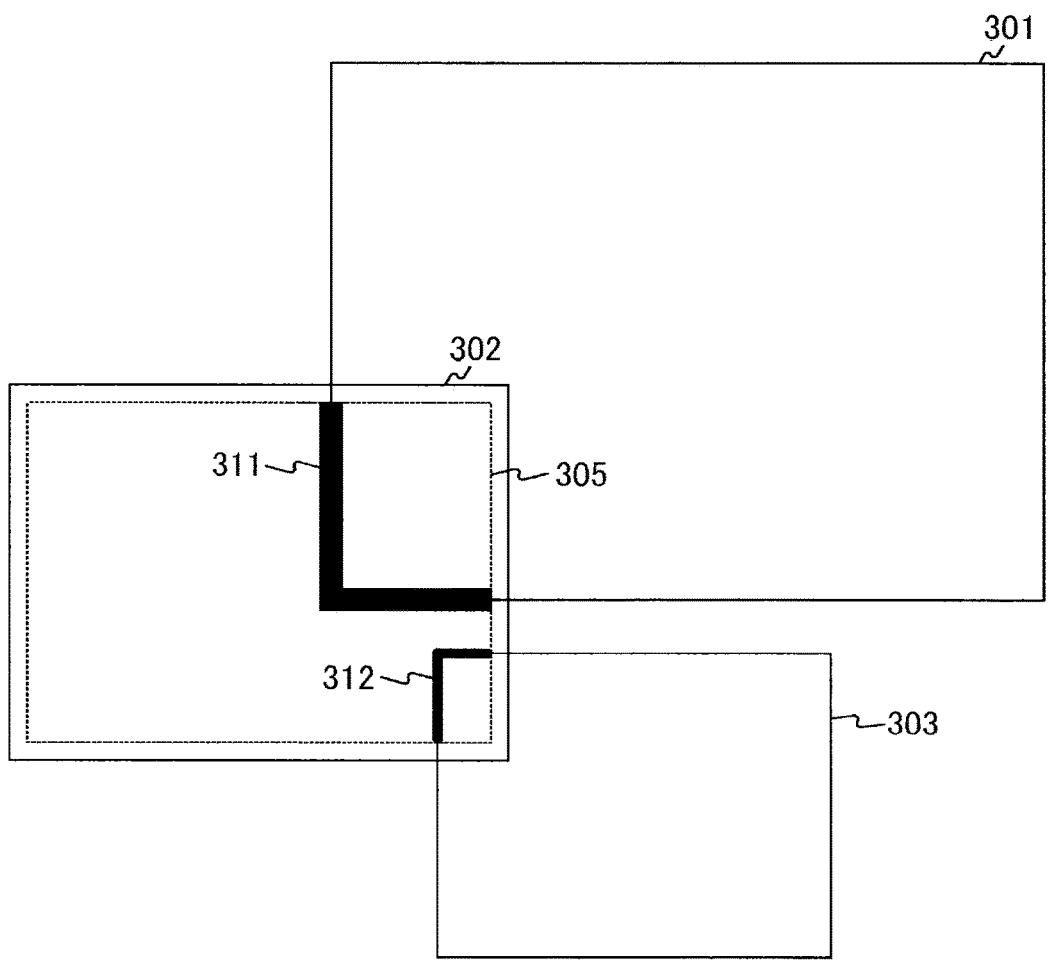
FIG. 15 illustrates a display example in which area information is displayed along with the image (foreground image) to be displayed on the display unit 112 according to a third embodiment of the present technology.

Example in which Frame Thickness is Changed Based on the Size of the Angle of Field FIG. 15 illustrates an example in which the thickness of the frame is changed based on the size of the angle of field.

For example, the frame is made thicker the larger the size of the angle of field is. On the other hand, the frame is made thinner the smaller the size of the angle of field is.

For example, since the image 301 has a comparatively large angle of field, the frame 311 indicating the overlapping area of the image 301 is displayed comparatively thickly. On the other hand, since the image 303 has a comparatively small angle of field, the frame 312 indicating the overlapping area of the image 303 is displayed comparatively thinly.

It is noted that these relationships may be set so that the frame thickness is reversed. Namely, the frame may be made thinner the larger the size of the angle of field is, and thicker the smaller the size of the angle of field is.

Example in which Frame Color is Changed Based on the Size of the Angle of Field

FIG. 16 illustrates an example in which the color of the frame is changed based on the size of the angle of field.

For example, as illustrated in FIG. 16*b*, as the angle of field becomes larger, the color sequentially changes to purple, blue, green, yellow, orange, and red. It is noted that in FIG. 16*b*, an example of the relationship between angle of field size and color is shown in a line in the vertical axis. In FIG. 16*b*, the colored linear images (frames) are represented based on monochrome shading.

For example, as illustrated in FIG. 16*a*, since the image 301 has a comparatively large angle of field, the frame 321 indicating the overlapping area of the image 301 is displayed in red. On the other hand, since the image 303 has a comparatively small angle of field, the frame 322 indicating the overlapping area of the image 303 is displayed in green.

It is noted that these relationships may be set so that the frame color is reversed. Further, the colors may be set in an even more detailed manner.

Example in which Frame Type is Changed Based on the Size of the Angle of Field

FIG. 17 illustrates an example in which the type of frame is changed based on the size of the angle of field.

For example, as illustrated in FIG. 17*b*, as the angle of field becomes larger, the dotted-line interval can be set wider.

For example, as illustrated in FIG. 17*a*, since the image 301 has a comparatively large angle of field, the frame 331 indicating the overlapping area of the image 301 is displayed with a dotted line having a comparatively wide interval. On the other hand, since the image 303 has a comparatively small angle of field, the frame 332 indicating the overlapping area of the image 303 is displayed with a dotted line having a comparatively narrow interval.

It is noted that these relationships may be set so that the frame type is reversed. Further, the types may be set in even more detail.

Example in which the Timing for Making the Frame Disappear is Changed Based on the Size of the Angle of Field (Example in which the Frame Gradually Becomes Fainter)

Figure 18:
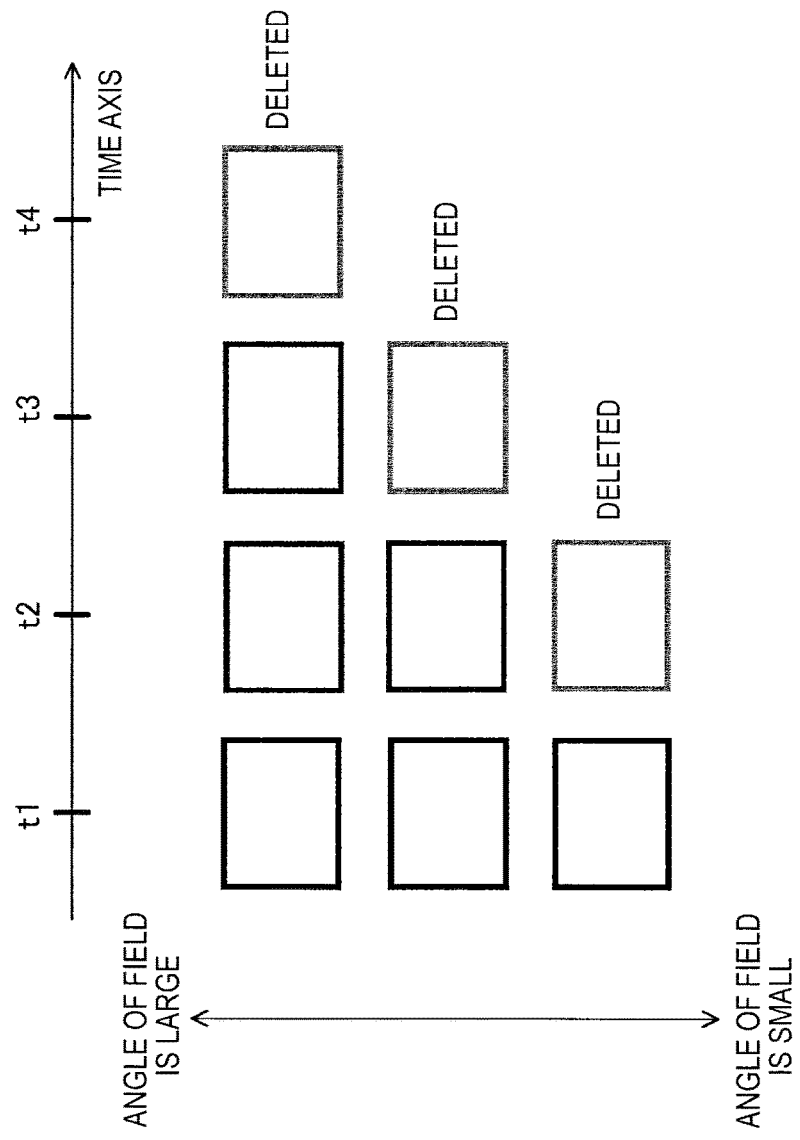
FIG. 18 illustrates a display example in which area information is displayed along with the image (foreground image) to be displayed on the display unit 112 according to a third embodiment of the present technology.

FIG. 18 illustrates an example in which the timing for making the frame disappear is changed based on the size of the angle of field. Here, the vertical axis in FIG. 18 represents the size of the angle of field, and the horizontal axis in FIG. 18 represents time.

On the time axis in FIG. 18, a time t1 represents the point at which a user operation was finished. Further, a time t2 represents the point at which a frame indicating an overlapping area of an image having a comparatively small angle of field is last displayed. Namely, past the time t2, the frame indicating an overlapping area of an image having a comparatively small angle of field is deleted. Similarly, a time t3 represents the point at which a frame indicating an overlapping area of an image having a medium-sized angle of field is last displayed, and a time t4 represents the point at which a frame indicating an overlapping area of an image having a comparatively large angle of field is last displayed.

As illustrated in FIG. 18, the display mode changes so that the frame becomes successively fainter from the point (time t1) at which the user operation was finished. Consequently, the impression can be given that the visible frame is gradually disappearing. This allows the user to see the frame transition naturally, without the sense of unnaturalness that would occur if a visible frame suddenly disappeared from view.

Example in which the Timing for Making the Frame Disappear is Changed Based on the Size of the Angle of Field (Example in which the Type of Frame is Gradually Changed)

Figure 19:
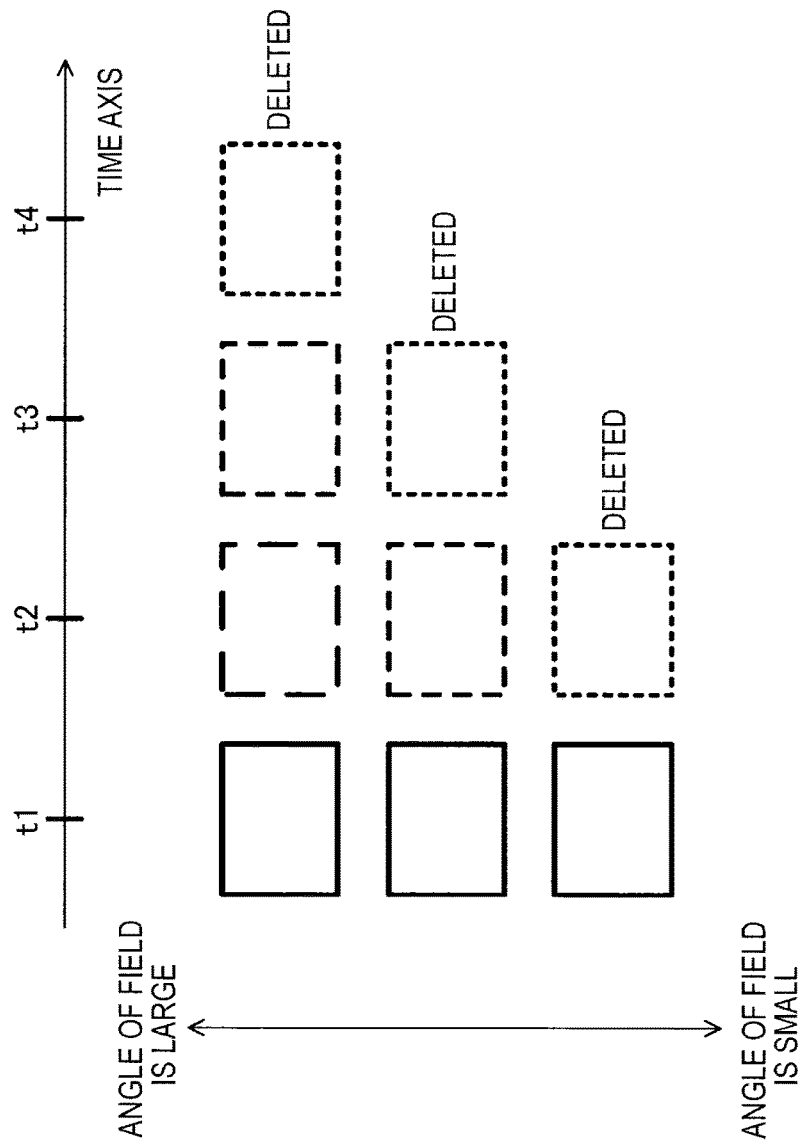
FIG. 19 illustrates a display example in which area information is displayed along with the image (foreground image) to be displayed on the display unit 112 according to a third embodiment of the present technology.

FIG. 19 illustrates an example in which the timing for making the frame disappear is changed based on the size of the angle of field. It is noted that the vertical and horizontal axes in FIG. 19 are the same as in FIG. 18. Further, time t1 to t4 on the time axis in FIG. 19 are also the same as in FIG. 18.

As illustrated in FIG. 19, the display mode changes so that the type of frame is sequentially switched from the point (time t1) at which the user operation was finished. Consequently, the user can confirm the transitions until the frame that was visible disappears.

Example in which the Timing for Making the Frame Disappear is Changed Based on the Size of the Angle of Field (Example in which the Frame Thickness is Gradually Changed)

Figure 20:
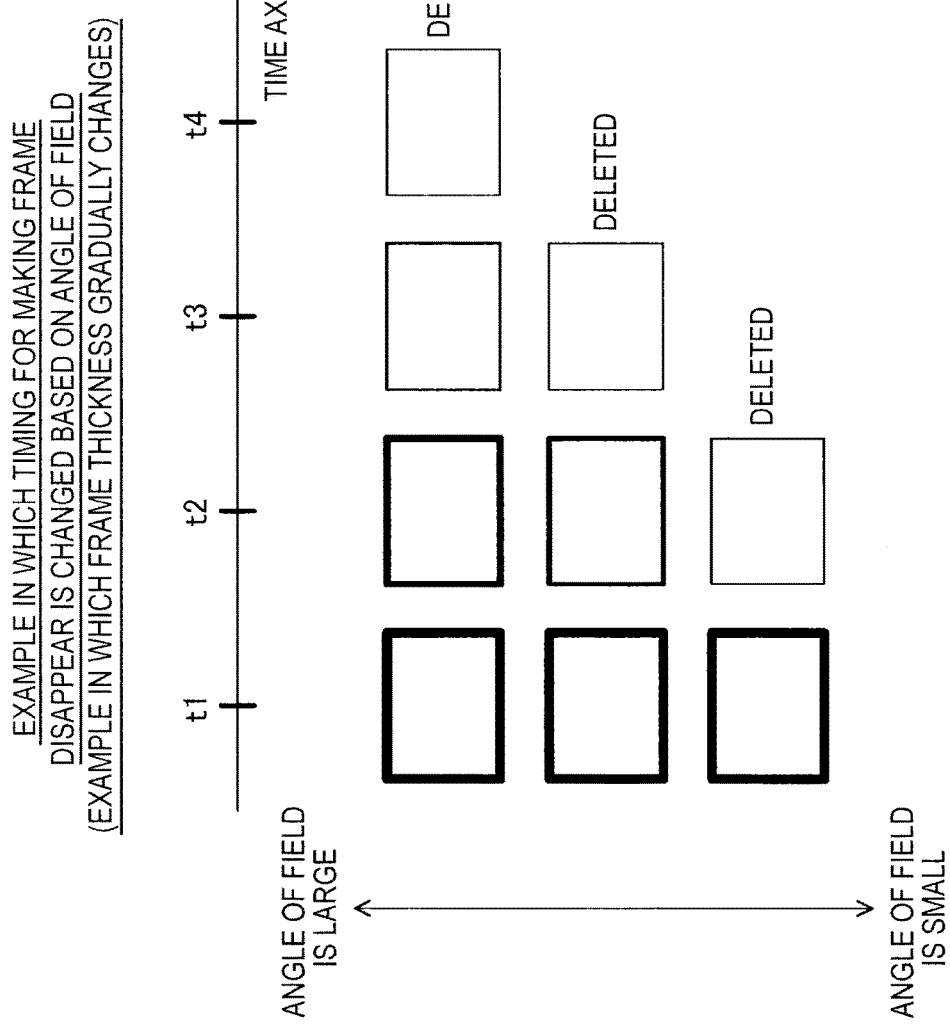
FIG. 20 illustrates a display example in which area information is displayed along with the image (foreground image) to be displayed on the display unit 112 according to a third embodiment of the present technology.

FIG. 20 illustrates an example in which the timing for making the frame disappear is changed based on the size of the angle of field. It is noted that the vertical and horizontal axes in FIG. 20 are the same as in FIG. 18. Further, time t1 to t4 on the time axis in FIG. 20 are also the same as in FIG. 18.

As illustrated in FIG. 20, the display mode changes so that the frame thickness is sequentially switched from the point (time t1) at which the user operation was finished. Consequently, the user can confirm the transitions until the frame that was visible disappears.

Other Display Examples

Examples were described above in which frames are displayed as area information. In the following, examples will be described in which area information is displayed by other display modes.

Figure 21:
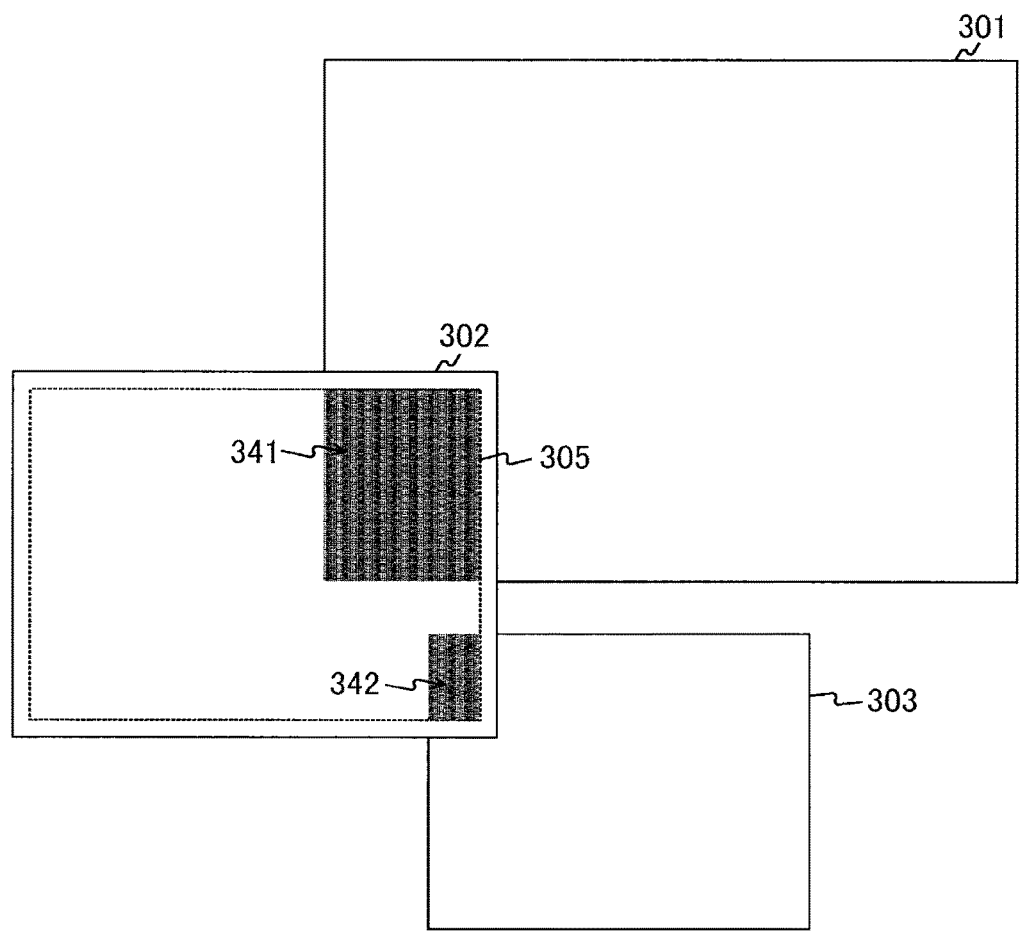
FIG. 21 illustrates a display example in which area information is displayed along with the image (foreground image) to be displayed on the display unit 112 according to a third embodiment of the present technology.
Figure 22:
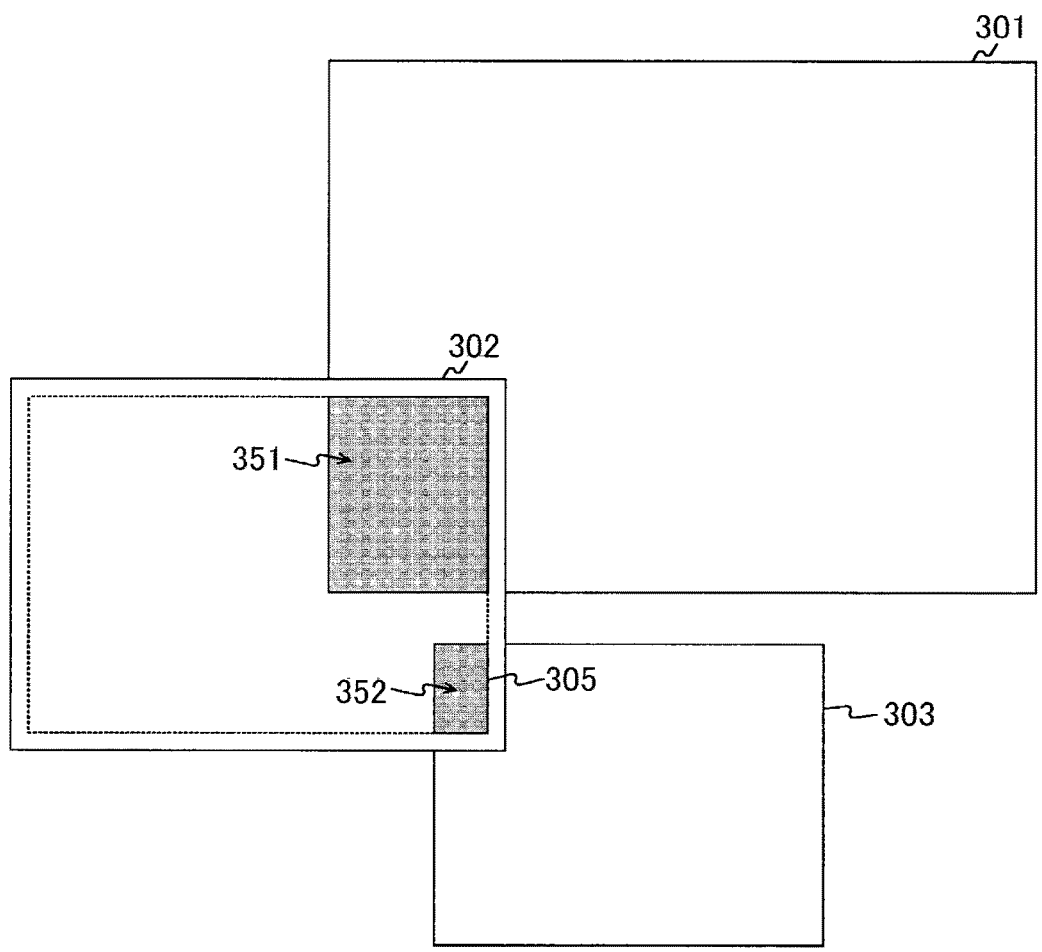
FIG. 22 illustrates a display example in which area information is displayed along with the image (foreground image) to be displayed on the display unit 112 according to a third embodiment of the present technology.
Figure 23:
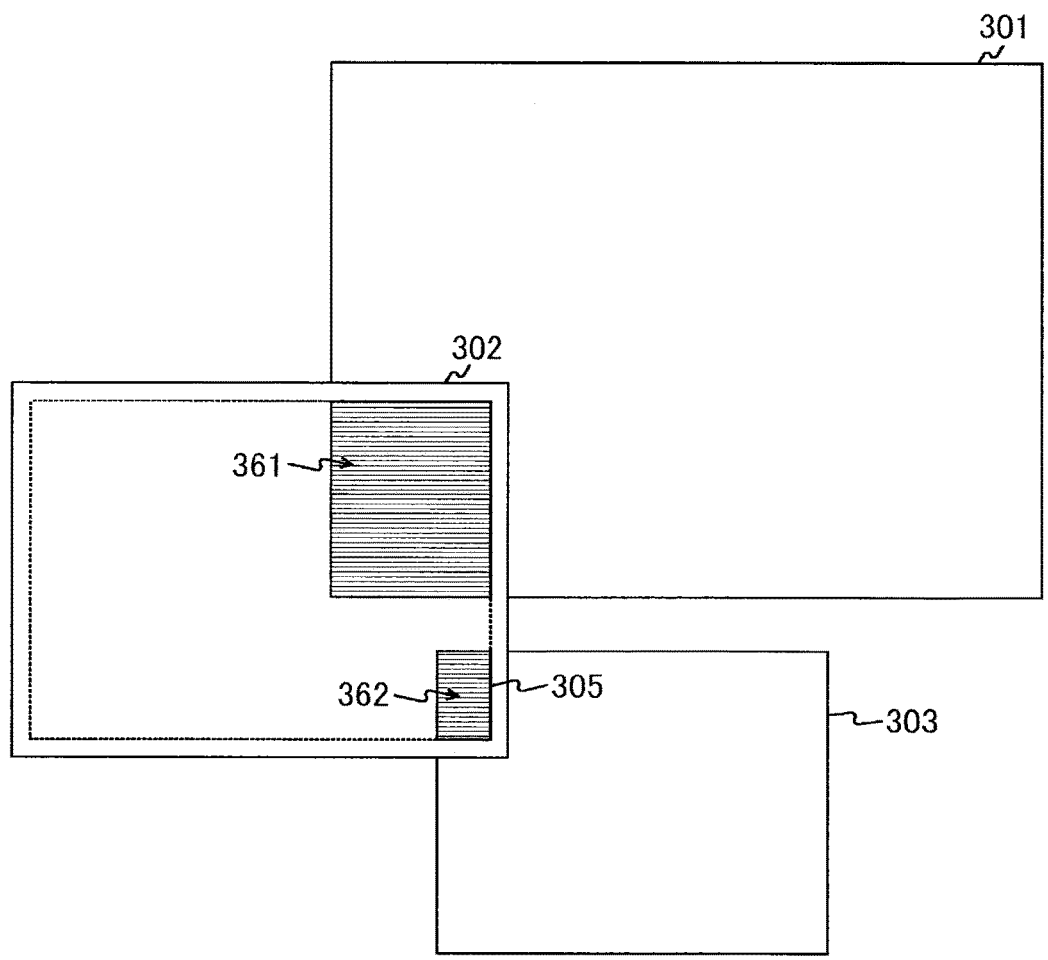
FIG. 23 illustrates a display example in which area information is displayed along with the image (foreground image) to be displayed on the display unit 112 according to a third embodiment of the present technology.

FIGS. 21 to 23 are diagrams illustrating display examples in which area information is displayed along with the image (foreground image) on the display unit 112 according to the third embodiment of the present technology. It is noted that images 301 to 303 and display target area 305 are the same as illustrated in FIGS. 15 to 17.

Example in which Area Information is Displayed by Highlighting

FIG. 21 illustrates an example in which area information is displayed by highlighting. For example areas 341 and 342 are highlighted. It is noted that, similar to the examples illustrated in FIGS. 15 to 17, the highlighted display can be changed based on the size of the angle of field. For example, brightness can be changed based on the size of the angle of field.

Example in which Area Information is Displayed by Highlighting with Different Colors FIG. 22 illustrates an example in which area information is displayed by highlighting with different colors. For example areas 351 and 352 are highlighted with different colors. In this case, as illustrated in FIG. 22, a frame can be provided around the outline of the area information. It is noted that, similar to the examples illustrated in FIGS. 15 to 17, the highlighted display can be changed based on the size of the angle of field. For example, a different color can be added based on the size of the angle of field.

Example in which Area Information is Displayed by a Hatched Display

FIG. 23 illustrates an example in which area information is displayed by a hatched display. For example areas 361 and 362 are displayed with hatching. In this case, as illustrated in FIG. 23, a frame can be provided around the outline of the area information. It is noted that, similar to the examples illustrated in FIGS. 15 to 17, the hatched display can be changed based on the size of the angle of field. For example, the hatching interval can be changed based on the size of the angle of field.

It is noted that the area information can also be displayed by some other display mode than the display modes illustrated in FIGS. 15 to 23. For example, the area information can also be displayed by using a specific color (e.g., light gray) for an overlapping area with other images.

Thus, the control unit 130 can change and display the display mode of the area information relating to other images based on image information about a plurality of images. Here, this image information about a plurality of images is, for example, the display size of other images (e.g., the angle of field), or the imaging conditions during imaging (e.g., the zoom magnification). Further, the control unit 130 can display as area information a linear image showing an outline corresponding to an overlapping area of the other images, and as a display mode of the area information, change at least one from among the thickness, color, and type of the linear image. In addition, as a display mode of the area information, the control unit 130 can change the timing since a user operation has been finished and until the area information is deleted.

Thus, according to the present embodiment of the present technology, a plurality of images that are associated with a state (position, orientation, zoom magnification) of the imaging apparatus when the imaging operation was carried out, and, a part or all of the images include a common object, can be simultaneously displayed as a single scene. In this case, while the user is performing an operation (scrolling, zooming), since area information (e.g., a frame) indicating an overlapping area with another image is displayed, the fact of whether there are images other than the displayed images and the zoom magnification can be intuitively expressed without harming image quality. Consequently, the user can intuitively grasp whether there are other images and the zoom magnification. For example, based on the displayed images, the user can easily grasp whether other images are present in the imaging range to the left or right or above or below that image, whether there are any high-resolution images captured by zooming and the like. Namely, when a plurality of related images are displayed, the user can easily grasp information about each image.

Further, while the user is performing an operation (scrolling, zooming), by displaying area information (e.g., a frame) indicating an overlapping area with another image, an important object (especially, a moving object) can be prevented from having its position changed or from disappearing. For example, when moving images are included in an overlapping area between an image displayed at the front and an image behind that image, the position of the moving images included in the overlapping area will probably be different to each other due to the movement of those moving images. In this case, if the rear image is displayed in front, the position of the moving image in that overlapping area can change or disappear. Even in such a case, by displaying a frame on the overlapping area of the image displayed in the front, the moving object can be prevented from having its position changed or from disappearing. Further, since only the frame is displayed on the overlapping area of the image displayed in the front, the feeling that something is wrong with the boundaries between the images can be prevented from occurring.

Further, for areas where a plurality of images overlap, a high-resolution image can be displayed naturally by adaptively switching the image to be displayed in front based on the resolution of the display, the display state (position and zoom magnification), and a user operation.

It is noted that in the embodiments of the present technology, although examples were illustrated that used an electrostatic (electrostatic capacitance type) touch panel, a pressure-sensitive type (resistance film pressure type) or an optical type touch panel can also be used. Further, the embodiments of the present technology can also be applied in a display control apparatus that does not include a touch panel.

In addition, the embodiments of the present technology can also be applied in other display control apparatuses (electronic devices) that are capable of displaying a plurality of images that are related to each other. For example, the embodiments of the present technology can also be applied in devices such as a digital still camera, a digital video camera (e.g., a camera built-in recorder), a digital photo frame, a smartphone, a tablet, a mobile telephone, a personal computer and the like.

It is noted that the above embodiments of the present technology illustrate an example for realizing the present technology, and that the matters in the embodiments of the present technology respectively correspond to the specific features in the Scope of Claims. Similarly, the specific features in the Scope of Claims respectively correspond to the matters in the embodiments of the present technology that were referred to using the same names. However, it should be understood by those skilled in the art that various modifications, combinations, sub-combinations and alterations may occur depending on design requirements and other factors insofar as they are within the scope of the appended claims or the equivalents thereof.

Further, the processing procedure described in the above embodiments of the present technology may be a method that has this series of steps, or may be a program that makes a computer execute this series of steps, or may even be a recording medium on which such a program is stored. Examples of this recording medium may include a CD (Compact Disc), a MD (MiniDisc), a DVD (Digital Versatile Disk), a memory card, a Blu-ray Disc® and the like.

Additionally, the present technology may also be configured as below.

(1) A display control apparatus including:
a display control unit configured to display, on a display unit, at least one of a plurality of images in which an imaging range of one image overlaps at least a part of an imaging range of another image based on a user operation; and
a control unit configured to, in a state in which the user operation has been performed, perform control to display a target image to be displayed, and area information indicating an overlapping area where the target image and an image other than the target image overlap.

(2) The display control apparatus according to (1), wherein the control unit is configured to perform control to display one or a plurality of the other images on the overlapping area.

(3) The display control apparatus according to (2),
wherein the control unit is configured to perform control to carry out image processing on a boundary area of a plurality of images displayed on the overlapping area in a manner that a resolution of each image matches, and
wherein the display control unit is configured to display the plurality of images subjected to the image processing carried out in a manner that the resolution matches.

(4) The display control apparatus according to any one of (1) to (3), wherein the control unit is configured to perform control to superimpose the area information on the target image.

(5) The display control apparatus according to any one of (1) to (4), wherein the control unit is configured to perform control to change and display a display mode of the area information relating to the other image in accordance with image information about the plurality of images.

(6) The display control apparatus according to (5), wherein the control unit is configured to perform control to display a linear image showing an outline corresponding to a display area of the other image as the area information, and to change at least one of a thickness, a color, and a type of the linear image as the display mode of the area information.

(7) The display control apparatus according to (5), wherein the control unit is configured to perform control to change a timing since the user operation has been finished and until the area information is deleted as the display mode of the area information.

(8) The display control apparatus according to any one of (1) to (7), wherein the display control unit is configured to select at least one of the plurality of images as the image to be displayed on the display unit based on a resolution of each of the plurality of images when displayed.

(9) The display control apparatus according to (8), wherein the display control unit is configured to display the other image when a displayed range of the target image is less than a predetermined proportion with respect to the target image.

(10) The display control apparatus according to (8), wherein the display control unit is further configured to select at least one of the plurality of images as the image to be displayed on the display unit based on a display capability of the display unit.

(11) A display control method including:
a first display procedure of displaying, on a display unit, at least one of a plurality of images in which an imaging range of one image overlaps at least a part of an imaging range of another image based on a user operation; and
a second display procedure of displaying, in a state in which the user operation has been performed, a target image to be displayed, and area information indicating an overlapping area where the target image and an image other than the target image overlap.

(12) A program for causing a computer to execute:
a first display procedure of displaying, on a display unit, at least one of a plurality of images in which an imaging range of one image overlaps at least a part of an imaging range of another image based on a user operation; and
a second display procedure of displaying, in a state in which the user operation has been performed, a target image to be displayed, and area information indicating an overlapping area where the target image and an image other than the target image overlap.

The present disclosure contains subject matter related to that disclosed in Japanese Priority Patent Application JP 2012-109093 filed in the Japan Patent Office on May 11, 2012, the entire content of which is hereby incorporated by reference.

What is claimed is:
1. A display control apparatus, comprising:
circuitry configured to:
display, on a display screen, at least one of a plurality of first images,
wherein an imaging range of a first image, of the plurality of first images, overlaps at least a part of an imaging range of a second image of the plurality of first images;
display the first image on the display screen;
display, based on a user operation on the displayed first image, a linear image that corresponds to boundary information of the second image on the first image, wherein
the boundary information indicates an overlapped area of the second image with the first image, and
the overlapped area is common between the first image and the second image; and
change, as a display mode of the boundary information, at least one of a color or a type of the linear image based on at least one of a zoom magnification of the plurality of first images or a display size of the first image.

2. The display control apparatus according to claim 1, wherein the boundary information indicates overlapped areas of a plurality of second images of the plurality of first images with the first image.

3. The display control apparatus according to claim 2, wherein the circuitry is further configured to process a boundary area of a plurality of overlapped images displayed on the overlapped area such that a first resolution of a third image of the plurality of overlapped images matches with a second resolution of a fourth image of the plurality of overlapped images, and wherein the circuitry is further configured to display the plurality of overlapped images such that the first resolution and the second resolution matches.

4. The display control apparatus according to claim 1, wherein the circuitry is further configured to superimpose the boundary information on the first image.

5. The display control apparatus according to claim 1, wherein the linear image comprises an outline that corresponds to a display area of the second image, and wherein the circuitry is further configured to change a thickness of the linear image as the display mode of the boundary information.

6. The display control apparatus according to claim 1, wherein the circuitry is further configured to change the display mode of the boundary information in a number of frames subsequent to a first frame at which the user operation is finished.

7. The display control apparatus according to claim 1, wherein the circuitry is further configured to select, based on a resolution of each of the plurality of first images, the at least one of the plurality of first images as the first image, and wherein the resolution of each of the plurality of first images corresponds to a number of pixels per unit length of at least an object in each of the plurality of first images.

8. The display control apparatus according to claim 7, wherein the circuitry is further configured to display a third image of the plurality of first images based on a display range of the first image that is less than a proportion with respect to the first image.

9. The display control apparatus according to claim 7, wherein the circuitry is further configured to select the at least one of the plurality of first images based on a display capability of the display screen.

10. The display control apparatus according to claim 1, wherein the circuitry is further configured to determine a display order to display a plurality of overlapped areas based on a display of the plurality of first images.

11. The display control apparatus according to claim 10, wherein the circuitry is further configured to:

calculate a resolution of the plurality of first images on a display surface of the display screen;
determine the display order of the plurality of first images based on the calculated resolution of the plurality of first images; and
display the plurality of first images on the display surface based on the determined display order.

12. The display control apparatus according to claim 1, wherein the circuitry is further configured to change, as the display mode of the boundary information, at least one of the color or the type of the linear image based on the zoom magnification of the plurality of first images.

13. A display control method, comprising:
displaying, on a display screen, at least a first image of a plurality of images, wherein an imaging range of the first image overlaps at least a part of an imaging range of a second image of the plurality of images;
displaying, based on a user operation on the displayed first image, a linear image that corresponds to boundary information of the second image on the first image, wherein
the boundary information indicates an overlapped area of the second image with the first image, and
the overlapped area is common between the first image and the second image; and
changing, as a display mode of the boundary information, at least one of a color or a type of the linear image based on at least one of a zoom magnification of the plurality of images or a display size of the first image.

14. A non-transitory computer-readable medium having stored thereon computer-executable instructions that, when executed by a processor, cause a computer to execute operations, the operations comprising:
displaying, on a display screen, at least a first image of a plurality of images, wherein an imaging range of the first image overlaps at least a part of an imaging range of a second image of the plurality of images;
displaying, based on a user operation on the displayed first image, a linear image that corresponds to boundary information of the second image on the first image, wherein
the boundary information indicates an overlapped area of the second image with the first image, and
the overlapped area is common between the first image and the second image; and
changing, as a display mode of the boundary information, at least one of a color or a type of the linear image based on at least one of a zoom magnification of the plurality of images or a display size of the first image.

* * * * *